(12) United States Patent
Russell et al.

(10) Patent No.: US 10,880,812 B2
(45) Date of Patent: Dec. 29, 2020

(54) VEHICLE-TO-EVERYTHING (V2X) SERVICE ACCESS

(71) Applicant: BlackBerry Limited, Waterloo (CA)

(72) Inventors: Nicholas James Russell, Newbury (GB); Stephen John Barrett, Haywards Heath (GB); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 190 days.

(21) Appl. No.: 16/042,837

(22) Filed: Jul. 23, 2018

(65) Prior Publication Data
US 2020/0029268 A1  Jan. 23, 2020

(51) Int. Cl.
| | |
|---|---|
| H04W 48/04 | (2009.01) |
| H04W 4/40 | (2018.01) |
| H04W 12/06 | (2009.01) |
| H04L 9/32 | (2006.01) |
| H04W 12/08 | (2009.01) |

(52) U.S. Cl.
CPC .......... *H04W 48/04* (2013.01); *H04L 9/3268* (2013.01); *H04W 4/40* (2018.02); *H04W 12/06* (2013.01); *H04W 12/08* (2013.01); *H04L 2209/80* (2013.01); *H04L 2209/84* (2013.01)

(58) Field of Classification Search
CPC ..... H04W 48/04; H04W 12/08; H04W 12/06; H04W 4/40; H04L 9/3268; H04L 2209/84; H04L 2209/80; H04L 63/00
See application file for complete search history.

(56) References Cited

U.S. PATENT DOCUMENTS

| | | | |
|---|---|---|---|
| 2012/0039323 A1* | 2/2012 | Hirano ............... | H04W 36/385 370/338 |
| 2014/0282470 A1* | 9/2014 | Buga ................. | G06F 8/65 717/170 |
| 2015/0358170 A1* | 12/2015 | Ando .................. | H04L 63/0823 713/156 |
| 2016/0087804 A1* | 3/2016 | Park .................... | H04L 63/0823 713/156 |
| 2017/0156105 A1* | 6/2017 | Mustajarvi ............ | H04W 48/14 |
| 2017/0279858 A1* | 9/2017 | Atarius ................. | H04L 12/189 |
| 2017/0331670 A1* | 11/2017 | Parkvall .............. | G08B 25/004 |
| 2018/0077668 A1* | 3/2018 | Chun ................... | H04W 8/005 |
| 2018/0152819 A1* | 5/2018 | Pinheiro ............... | H04W 4/80 |
| 2018/0199173 A1* | 7/2018 | Xu ......................... | H04L 1/18 |

(Continued)

OTHER PUBLICATIONS

3GPP TS 22.011 V16.0.0, Technical Specification, 3rd Generation Partnership Project; Technical Specification Group Services and System Aspects; Service accessibility (Release 16) (Dec. 2017) (32 pages).

(Continued)

*Primary Examiner* — J. Brant Murphy
(74) *Attorney, Agent, or Firm* — Trop, Pruner & Hu, P.C.

(57) ABSTRACT

In some examples, a vehicle-to-everything (V2X) endpoint receives V2X service control information that indicates whether the V2X endpoint is allowed to use one or more V2X services. The V2X endpoint sends, to a network, the V2X service control information when attempting to access a V2X service or a group of V2X services, and receives, from the network in response to the sending of the V2X service control information, V2X authorization information relating to accessing one or more V2X services.

22 Claims, 24 Drawing Sheets

(56) References Cited

U.S. PATENT DOCUMENTS

| | | | |
|---|---|---|---|
| 2018/0199194 A1* | 7/2018 | Xu | H04W 36/0011 |
| 2018/0206089 A1* | 7/2018 | Cavalcanti | H04W 60/00 |
| 2019/0037448 A1* | 1/2019 | Shan | H04W 4/48 |
| 2019/0150046 A1* | 5/2019 | Shiga | H04W 4/44 370/331 |
| 2019/0158489 A1* | 5/2019 | Ben Henda | H04W 12/0802 |
| 2019/0200228 A1* | 6/2019 | Adrangi | H04W 4/40 |
| 2019/0230645 A1* | 7/2019 | Cheng | H04W 12/06 |
| 2019/0313305 A1* | 10/2019 | Karampatsis | H04W 76/14 |

OTHER PUBLICATIONS

3GPP TS 23.285 V14.5.0, Technical Specification, 3rd Generation Partnership Project; Technical Specification Group Services and System Aspects; Architecture enhancements for V2X services (Release 14) (Dec. 2017) (36 pages).
3GPP TS 23.401 V15.2.0, Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 15) (Dec. 2017) (404 pages).
3GPP TS 23.501 V15.0.0, Technical Specification, 3rd Generation Partnership Project; Technical Specification Group Services and System Aspects; System Architecture for the 5G System; Stage 2 (Release 15) (Dec. 2017) (181 pages).
3GPP TS 23.502 V15.0.0, Technical Specification, 3rd Generation Partnership Project; Technical Specification Group Services and System Aspects; Procedures for the 5G System; Stage 2 (Release 15) (Dec. 2017) (258 pages).
3GPP TS 24.008 V15.1.0, Technical Specification, 3rd Generation Partnership Project; Technical Specification Group Core Network and Terminals; Mobile radio interface Layer 3 specification; Core network protocols; Stage 3 (Release 15) (Dec. 2017) (785 pages).
3GPP TS 24.301 V15.1.1, Technical Specification, 3rd Generation Partnership Project; Technical Specification Group Core Network and Terminals; Non-Access-Stratum (NAS) protocol for Evolved Packet System (EPS); Stage 3 (Release 15) (Jan. 2018) (507 pages).
3GPP TS 24.302 V15.1.0, Technical Specification, 3rd Generation Partnership Project; Technical Specification Group Core Network and Terminals; Access to the 3GPP Evolved Packet Core (EPC) via non-3GPP access networks; Stage 3 (Release 15) (Dec. 2017) (171 pages).
3GPP TS 29.060 V15.1.0, Technical Specification, 3rd Generation Partnership Project; Technical Specification Group Core Network and Terminals; General Packet Radio Service (GPRS); GPRS Tunnelling Protocol (GTP) across the Gn and Gp interface (Release 15) (Dec. 2017) (193 pages).
3GPP TS 29.061 V15.1.0, Technical Specification, 3rd Generation Partnership Project; Technical Specification Group Core Network and Terminals; Interworking between the Public Land Mobile Network (PLMN) supporting packet based services and Packet Data Networks (PDN) (Release 15) (Dec. 2017) (171 pages).
3GPP TS 29.274 V15.2.0, Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15) (Dec. 2017) (380 pages).
3GPP TS 33.180 V15.0.0, Technical Specification, 3rd Generation Partnership Project; Technical Specification Group Services and System Aspects; Security of the mission critical service; (Release 15) (Jan. 2018) (169 pages).
3GPP TS 33.501 V0.7.0, Technical Specification, 3rd Generation Partnership Project; Technical Specification Group Services and System Aspects; Security architecture and procedures for 5G system (Release 15) (Jan. 2018) (109 pages).
3GPP TS 33.501 V15.1.0, Technical Specification, 3rd Generation Partnership Project; Technical Specification Group Services and System Aspects; Security architecture and procedures for 5G system (Release 15) (Jun. 2018) (152 pages).
ETSI, Technical Specification, Intelligent Transport Systems (ITS); Security; ETSI TS 102 941 V1.2.1 (May 2018) (71 pages).
IEEE Standard for Wireless Access in Vehicular Environments—Security Services for Applications and Management Messages, IEEE Vehicular Technology Society, IEEE Std 1609.2™-2016 (Revision of IEEE Std 1609.2-2013) (241 pages).
Aboda et al., Network Working Group, Request for Comments: 3748, Obsoletes: 2284, Category: Standards Track, Extensible Authentication Protocol (EAP), Jun. 2004 (67 pages).
Haverinen et al., Network Working Group, Request for Comments: 4186, Category: Informational, Extensible Authentication Protocol Method for Global System for Mobile Communications (GSM) Subscriber Identity Modules (EAP-SIM) Jan. 2006 (92 pages).
Arkko et al., Network Working Group, Request for Comments: 4187, Category: Informational, Extensible Authentication Protocol Method for 3rd Generation Authentication and Key Agreement (EAP-AKA), Jan. 2006 (79 pages).
Arkko et al., Network Working Group, Request for Comments: 5448, Updates: 4187, Category: Informational, Improved Extensible Authentication Protocol Method for 3rd Generation Authentication and Key Agreement (EAP-AKA) May 2009 (29 pages).
D. Eastlake, Internet Engineering Task Force (IETF), Request for Comments: 6066, Obsoletes: 4366, Category: Standards Track, ISSN: 2070-1721, Transport Layer Security (TLS) Extensions: Extension Definitions, Jan. 2011 (25 pages).
D. Hardt, Internet Engineering Task Force (IETF), Request for Comments: 6749, Obsoletes: 5849, Category: Standards Track, ISSN: 2070-1721, The OAuth 2.0 Authorization Framework, Oct. 2012 (76 pages).
Santesson et al., Internet Engineering Task Force (IETF), Request for Comments: 6960, Obsoletes: 2560, 6277, Updates: 5912, Category: Standards Track, ISSN: 2070-1721, X.509 Internet Public Key Infrastructure Online Certificate Status Protocol—OCSP, Jun. 2013 (41 pages).
Y. Pettersen, Internet Engineering Task Force (IETF), Request for Comments: 6961, Category: Standards Track, ISSN: 2070-1721, The Transport Layer Security (TLS) Multiple Certificate Status Request Extension, Jun. 2013 (10 pages).
Jones et al., Internet Engineering Task Force (IETF), Request for Comments: 7519, Category: Standards Track, ISSN: 2070-1721, JSON Web Token (JWT), May 2015 (30 pages).
Jones et al., Internet Engineering Task Force (IETF), Request for Comments: 7523, Category: Standards Track, ISSN: 2070-1721, JSON Web Token (JWT) Profile for OAuth 2.0 Client Authentication and Authorization Grants, May 2015 (12 pages).
International Telecommunication Union, ITU-T X.509 Telecommunication Standardization Sector of ITU, X.509, Series X: Data Networks, Open System Communications and Security, Directory, Information technology—Open Systems Interconnection—The Directory: Public-key and attribute certificate frameworks, Recommendation ITU-T X.509 (Oct. 2016) (254 pages).
ISA/U.S. International Search Report and Written Opinion for International Appl. No. PCT/US2019/041765 dated Oct. 4, 2019 (12 pages).
Wikipedia, JSON last edited May 10, 2018 (15 pages).
Wikipedia, JSON Web Token last edited May 9, 2018 (5 pages).
Wikipedia, OAuth last edited Apr. 1, 2018 (8 pages).
Wikipedia, OpenID last edited Apr. 18, 2018 (15 pages).

* cited by examiner

Table 1

X.1.1 ID token

X.1.1.0 General

The ID Token shall be a JSON Web Token (JWT) and contain the following standard and V2X token claims. Token claims provide information pertaining to the authentication of the V2X user by the IdM (ID Management) server as well as additional claims..

.....

X.1.1.3 UICC claims

The UICC Connect profile extends the OpenID Connect standard claims with the additional claims shown in table X.1.1.3-1.

Table X.1.1.3-1: ID token UICC claims

| Parameter | Description |
|---|---|
| NAS identity | Optional. This contains the identity of the identity of the V2X UE:<br>• Public User Identity of the V2X UE<br>• Private User Identity of the V2X UE<br>• An arbitrary identity to be used by the V2X UE |
| User Identity | Optional. This contains the identity of the identity of the user of V2X UE:<br>• Public User Identity of the user of the V2X UE<br>• Private User Identity of the user of the V2X UE<br>• An arbitrary identity to be used by the user of the V2X UE |

X.3.1.3 Token request

In order to exchange the authorization code for an ID token, access token and refresh token, the V2X client makes a request to the authorization server's token endpoint by sending the following parameters using the "application/x-www-form-urlencoded" format, with a character encoding of UTF-8 in the HTTP request entity-body. Note that client authentication is REQUIRED for native applications (using PKCE) in order to exchange the authorization code for an access token. Assuming that client secrets are used, the client secret is sent in the HTTP Authorization Header. The token request standard parameters are shown in table B.3.1.3-1.

Table X.3.1.3-1: Token Request standard required parameters

| Parameter | Values |
|---|---|
| grant_type | REQUIRED. The value shall be set to "authorization_code". |

FIG. 9A

| | |
|---|---|
| code | REQUIRED. The authorization code previously received from the IdM server as a result of the authorization request and subsequent successful authentication of the MCX user. |
| client_id | REQUIRED. The identifier of the client making the API request. It shall match the value that was previously registered with the OAuth Provider during the client registration phase of deployment, or as provisioned via a development portal. |
| redirect_uri | REQUIRED. The value shall be identical to the "redirect_uri" parameter included in the authorization request. |
| code_verifier | REQUIRED. A cryptographically random string that is used to correlate the authorization request to the token request. |
| Service Network of V2X UE | Identity of the Network that is serving the V2X UE |
| Location | Can be: Service Provider Identity Location Area , Routing Area, Tracking Area |
| Private_User_Identity | Optional Private User identities from UICC Application |
| NOTE: Each instance of the parameter shall be appended with a numeric value representing the next instance. | |

Annex C (informative):
OpenID connect detailed flow

C.1 Detailed flow for V2X UE authentication and registration using OpenID Connect Fig. 6 shows the detailed flow for V2X User Authentication and Registration using the OpenID Connect messages as described in annex B.

Step 0: The UE attaches to the network, establishes normal connectivity, and sets up network security as defined in 3GPP TS 33.401.

Step 3a: The IdM client in the UE issues a HTTPS Authentication request to the OIDC based IdM Server in the V2X network. The client includes the code_challenge value in this request.

FIG. 9B

| | |
|---|---|
| Step 3b: | The V2X User Identity and associated credentials (e.g., username and password, car key, both) are provided to the IdM server. The credentials are successfully authenticated (and optionally authorized) by the IdM Server. |
| Step 3c: | The IdM Server may optionally request user consent for granting the V2X client access to the V2X service in the V2X Server. |
| Step 3d: | The IdM Server generates an authorization code that is associated with the code_challenge provided by the client. It sends a browser redirect HTTP message with the Authorization Response containing the authorization code. |
| Step 3e: | The UE IdM Client performs a HTTP POST request to exchange the authorization code for an access token. In the request, the client includes the code-verifier string. This string is cryptographically associated with the code_challenge value provided in the Authorization Request in Step 3a.<br><br>As part of Step 3a, 3b or 3e the UE (V2X endpoint) includes the following information in the message sent to the IdM server:<br><br>- Private identity(s) of the UE (e.g., IMSI, IMPU etc).<br>- Location of the UE.<br>- Certificate. |
| Step 3f: | The IdM Server verifies the IdM Client based on the received code-verifier string and issues a 200 OK with an access token and ID token. The token (Access or ID) contains the JSON Web Token claim containing at least one service identity with appropriate user name and password to access that service. |
| NOTE: | The server verifies by calculating the code challenge from the received code_verifier and comparing it with the code_challenge value provided by the client in Step 3a. |
| Step 3g: | The access token and ID token are made available to the V2X client(s). |
| Step 4: | The V2X UE performs user service authorization including the Access or ID token so that the V2X UE can access V2X services. |

FIG. 9C

Table 2

| |
|---|
| 6.2.5  V2X service authorization |
| If the UE performs 3GPP-based access authentication, the 3GPP AAA server may send a token from the non-3GPP access network to the UE during the EAP-AKA or EAP-AKA' based access authentication (i.e. EAP-AKA, EAP-AKA'). The indicator is sent using a AT_V2X_service_authorisation_RESP, by extending the EAP-AKA (and EAP-AKA') protocol as specified in subclause 8.2 of IETF RFC 4187. This attribute is provided in EAP-Request/AKA-Challenge or EAP- Request/AKA'-Challenge message payload respectively. The detailed coding of this attribute is described in subclause 8.2.X.1. |
| 6.XA   V2X token configuration (X could be a 4 or a 5, so 6.4A or 6.5A, etc.) |
| 6.XA.1        UE Procedures |
| Tasks 3-4 of Fig. 7)      If: |
|    a) the UE supports the "Configuration request"; |
|    b) the EAP-Request/AKA'-Challenge message includes the AT_V2X_service_authorisation_REQUEST_SUPPORTED attribute as described in subclause 8.2.X.1 wherein the message field as described in subclause 8.1.4.1: |
|       1) contains the message type field indicating V2X_config_REQUEST_SUPPORTED; and |
|       2) contains the type field including the V2X_config Request Supported field_item as described in subclause 8.2.X.1 indicating V2X_config Supported; and |
|    c) the UE requests usage of the " V2X_config "; |
| Tasks 5-6 of Fig. 7)      then the UE: |
|    a) shall include the AT_V2X_service_authorisation_REQUEST attribute according to subclause 8.2.X.2 in the EAP-Response/AKA'-Challenge message. In the message field according to subclause 8.1.4.1 of the AT_V2X_config_REQUEST attribute, the UE shall: |
|       1) set the message type field to V2X_config_REQUEST; and |
|       2) contains the type field including the V2X_config Request field_item as described in subclause 8.2.X.2 indicating V2X_config requested; and |

FIG. 10A

Tasks 7-8 of Fig. 7) Upon receiving the EAP-Request/AKA'-Notification message including the AT_V2X_service_authorisation_RESP attribute as described in subclause 8.2.X.3 where the message field as described in subclause 8.1.4.1:
- contains the message type field indicating V2X_config_RESP; and

- contains the field V2X_config Encoded;

the UE:
- stores the V2X_config received to be used in subsequent procedures.

6.XA.2      AAA Procedures

The 3GPP AAA server may support V2X_config configuration.

Tasks 3-4 of Fig. 7) If the network supports V2X_config configuration, the 3GPP AAA server shall include
   a) in the EAP-Request/AKA'-Challenge message, the
      AT_V2X_service_authorisation_REQUEST_SUPPORTED attribute as described in subclause 8.2.X.1, wherein the message field as described in subclause 8.1.4.1:

1) contains the message type field indicating V2X_config_REQUEST_SUPPORTED; and 2) contains the type field including the V2X_config Request Supported field item as described in subclause 8.2.X.1 indicating V2X_config Supported; and Tasks 5-6 of Fig. 7) If the 3GPP AAA server supports V2X_config configuration; and the AAA server receives the AT_V2X_service_authorisation_REQUEST attribute according to subclause 8.2.X.2 in the EAP-Response/AKA'-Challenge message and in the message field according to subclause 8.1.4.1 of the AT_V2X_service_authorisation_REQUEST attribute:

1) the message type field is set to V2X_config_REQUEST; and 2) contains the type field including the "V2X_config_REQUEST_SUPPORTED" value (see Table 8.1.4.1-2) as described in subclause 8.2.X.2 indicating V2X_config requested;

then the AAA server optionally contacts an external database e.g. HSS, PCRF to obtain the V2X_config to be used and provides those V2X_config in the EAP-RSP/AKA'-identity message.

Tasks 7-8 of Fig. 7) The AAA sends the EAP-Request/AKA'-Notification message including the AT_V2X_config_RESP attribute as described in subclause 8.2.X.3 where the message field as described in subclause 8.1.4.1:
- contains the message type field indicating V2X_config_RESP; and

- contains the field V2X_config Encoded as described in subclause 8.2.x.3.2;

FIG. 10B

8  PDUs and parameters specific to the present document

8.1  3GPP specific coding information defined within present document

8.1.4  PDUs for TWAN connection modes

8.1.4.1  Message

The message is coded according to table 8.1.4.1-2.

Table 8.1.4.1-2: Message type

```
The value is coded as follows.
7  6  5  4  3  2  1  0
0  0  0  0  0  0  0  1    CONNECTION_CAPABILITY
0  0  0  0  0  0  1  0    SCM_REQUEST
0  0  0  0  0  0  1  1    SCM_RESPONSE
0  0  0  0  0  1  0  0    MCM_REQUEST
0  0  0  0  0  1  0  1    MCM_RESPONSE
0  0  0  0  0  1  1  1    V2X_config_REQUEST_SUPPORTED
0  0  0  0  1  0  0  0    V2X_config_REQUEST
```

8.2.X  Identity attributes

8.2.X.1  AT_V2X_service_Request Supported attribute

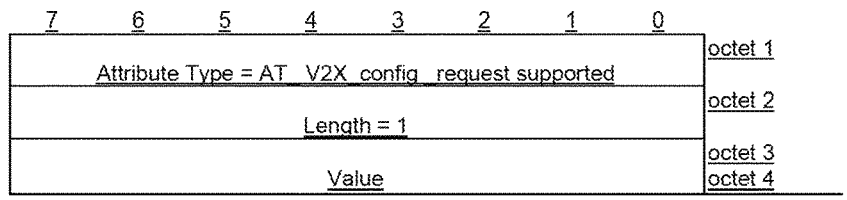

Table 8.2.X.1-1: : AT_V2X_service_Request Supported

Octet 1 (in Figure 8.2.X.1-1) indicates the type of attribute as AT_V2X_service_Request Supported.

Octet 2 (in Figure 8.2.X.1-1) is the length of this attribute which shall be set to 1 as per IETF RFC 4187 [33]

FIG. 10C

Octets 3 (in Figure 8.2.X.1-1) and 4 (in Figure 8.2.X.1-1) are the value of the attribute. Octet 3 (in Figure 8.2.X.1-1) is reserved and shall be coded as zero. Octet 4 (in Figure 8.2.X.1-1) shall be set as follows. All other values are reserved.

| 7 | 6 | 5 | 4 | 3 | 2 | 1 | 0 | V2X_config Request Supported field |
|---|---|---|---|---|---|---|---|---|
| 0 | 0 | 0 | 0 | 0 | 0 | 0 | 1 | V2X_config Request Supported |
| 0 | 0 | 0 | 0 | 0 | 0 | 1 | 0 | V2X_config Request not supported |
| 1 | 1 | 1 | 1 | 1 | 1 | 1 | 1 | Reserved |

8.2.X.2    AT_V2X_service_authorisation_Request attribute

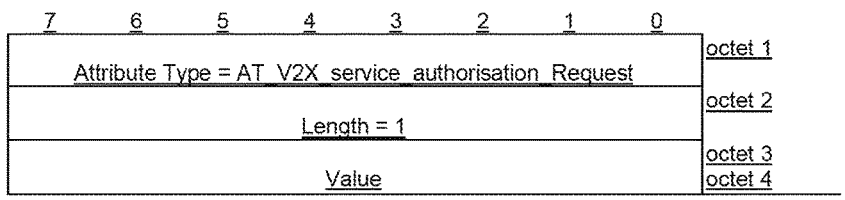

Table 8.2.X.2-1: : AT_V2X_service_authorisation_Request attribute

Octet 1 (in Figure 8.2.X.2-1) indicates the type of attribute as AT_V2X_service_authorisation_Request with a value of 1XX.

Octet 2 (in Figure 8.2.X.2-1) is the length of this attribute which shall be set to 1 as per IETF RFC 4187 [33]

Octet 3 (in Figure 8.2.X.2-1) and 4 (in Figure 8.2.X.2-1) is the value of the attribute. Octet 3 (in Figure 8.2.X.2-1) is reserved and shall be coded as zero. Octet 4 (in Figure 8.2.X.2-1) shall be set as follows. All other values are reserved.

| 7 | 6 | 5 | 4 | 3 | 2 | 1 | 0 | V2X_config requested field |
|---|---|---|---|---|---|---|---|---|
| 0 | 0 | 0 | 0 | 0 | 0 | 0 | 1 | V2X_config requested |
| 0 | 0 | 0 | 0 | 0 | 0 | 1 | 0 | Reserved to |
| 1 | 1 | 1 | 1 | 1 | 1 | 1 | 1 | Reserved |

8.2.X.3    AT_V2X_service_authorisation_RESP attribute
8.2.X.3.1    General

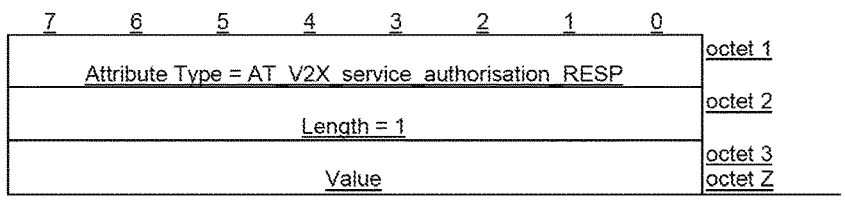

8.2.x.3.2    V2X_config encoded

FIG. 10D

There may be multiple V2X_configs encoded in the AT_V2X_service_authorisation_RESP_attribute.

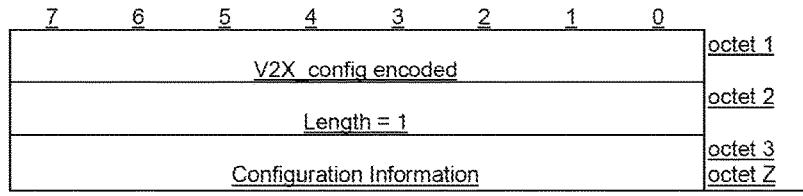

| 7 | 6 | 5 | 4 | 3 | 2 | 1 | 0 | |
|---|---|---|---|---|---|---|---|---|
| V2X_config encoded | | | | | | | | octet 1 |
| Length = 1 | | | | | | | | octet 2 |
| Configuration Information | | | | | | | | octet 3 octet Z |

Table 8.2.X.3-1: : AT_V2X_service_authorisation_RESP attribute Value

Octet 1 (in Figure 8.2.X.3-1) indicates the identity that is encoded.

Octet 1 (in Figure 8.2.X.3-1) shall be set as follows. All other values are reserved.

| 7 | 6 | 5 | 4 | 3 | 2 | 1 | 0 | V2X_config Encoded field |
|---|---|---|---|---|---|---|---|---|
| 0 | 0 | 0 | 0 | 0 | 0 | 0 | 1 | Reserved |
| 0 | 0 | 0 | 0 | 0 | 0 | 1 | 0 | Reserved |
| 0 | 0 | 0 | 0 | 0 | 0 | 1 | 1 | Access Token |
| 0 | 0 | 0 | 0 | 0 | 1 | 0 | 0 | Reserved |
| 0 | 0 | 0 | 0 | 0 | 1 | 0 | 1 | Reserved |
| 0 | 0 | 0 | 0 | 0 | 1 | 1 | 0 | Reserved |
| 0 | 0 | 0 | 0 | 0 | 1 | 1 | 1 | Reserved to |
| 1 | 1 | 1 | 1 | 1 | 1 | 1 | 1 | Reserved |

When Octet 1 is

1. ACCESS TOKEN encoding and shall be as specified in xxxxxxx. The "xxxxxxx" means that the structure of V2X Data is defined.

FIG. 10E

Table 3

> The purpose of the *protocol configuration options* information element is to
>
> Table 10.5.154/3GPP TS 24.008: *Protocol configuration options* information element
>
> > Configuration protocol (octet 3)
> > Bits
> > 3 2 1
> > 0 0 0   PPP for use with IP PDP type or IP PDN type (see 3GPP TS 24.301)
> >
> > All other values are interpreted as PPP in this version of the protocol.
> > After octet 3, i.e. from octet 4 to octet z, two logical lists are defined:
> > -   the Configuration protocol options list (octets 4 to w), and
> > -   the Additional parameters list (octets w+1 to z).
> > Configuration protocol options list (octets 4 to w)
> >
> > .......
> > Additional parameters list (octets w+1 to z)
> > The *additional parameters list* is included when special parameters and/or requests (associated with a PDP context) need to be transferred between the MS and the network. These parameters and/or requests are not related to a specific configuration protocol (e.g. PPP), and therefore are not encoded as the "Packets" contained in the *configuration protocol options list*.
> > The *additional parameters list* contains a list of special parameters, each one in a separate container. The type of the parameter carried in a container is identified by a specific *container identifier*. In this version of the protocol, the following container identifiers are specified:
> > MS to network direction:
> > -   0001H (P-CSCF IPv6 Address Request);
> > -   0002H (IM CN Subsystem Signaling Flag);
> > -   0003H (DNs Server IPv6 Address Request);
> > -   0004H (Not Supported);
> > -   0005H (MS Support of Network Requested Bearer Control indicator);
> > -   0006H (Reserved);

FIG. 11A

- 0007H (DSMIPv6 Home Agent Address Request;
- 0008H (DSMIPv6 Home Network Prefix Request);
- 0009H (DSMIPv6 IPv4 Home Agent Address Request);
- 000AH (IP address allocation via NAS signaling);
- 000BH (IPv4 address allocation via DHCPv4);
- 000CH (P-CSCF IPv4 Address Request);
- 000DH (DNs Server IPv4 Address Request);
- 000EH (MSISDN Request);
- 000FH (IFOM-Support-Request);
- 0010H (IPv4 Link MTU Request);
- 0011H (MS support of Local address in TFT indicator); ~~and~~
- 0012H (V2X token included);
- 0013H (V2X token not included); and
- FF00H to FFFFH reserved for operator specific use.

Network to MS direction:
- 0001H (P-CSCF IPv6 Address);
- 0002H (IM CN Subsystem Signaling Flag);
- 0003H (DNs Server IPv6 Address);
- 0004H (Policy Control rejection code);
- 0005H (Selected Bearer Control Mode;
- 0006H (Reserved);
- 0007H (DSMIPv6 Home Agent Address) ;
- 0008H (DSMIPv6 Home Network Prefix);
- 0009H (DSMIPv6 IPv4 Home Agent Address);
- 000AH (Reserved);
- 000BH (Reserved);
- 000CH (P-CSCF IPv4 Address);
- 000DH (DNs Server IPv4 Address);
- 000EH (MSISDN);
- 000FH (IFOM-Support);
- 0010H (IPv4 Link MTU);
- 0011H (Network support of Local address in TFT indicator); ~~and~~
- 0012H (Provisioned V2X services); and
- FF00H to FFFFH reserved for operator specific use.......

FIG. 11B

Table 4

> 10.5.6.3   Protocol configuration options
>
> The purpose of the *protocol configuration options* information element is to:
> - transfer external network protocol options associated with a PDP context activation, and
> - transfer additional (protocol) data (e.g. configuration parameters, error codes or messages/events) associated with an external protocol or an application.
>
> The *protocol configuration options* is a type 4 information element with a minimum length of 3 octets and a maximum length of 253 octets.
>
> The *protocol configuration options* information element is coded as shown in figure 10.5.136/3GPP TS 24.008 and table 10.5.154/3GPP TS 24.008.
>
> Table 10.5.154/3GPP TS 24.008: *Protocol configuration options* information element
>
> > Configuration protocol (octet 3)
> > Bits
> > 3 2 1
> > 0 0 0   PPP for use with IP PDP type or IP PDN type (see 3GPP TS 24.301)
> >
> > All other values are interpreted as PPP in this version of the protocol.
> > After octet 3, i.e. from octet 4 to octet z, two logical lists are defined:
> > -       the Configuration protocol options list (octets 4 to w), and
> > -       the Additional parameters list (octets w+1 to z).
> > Configuration protocol options list (octets 4 to w)
> > .......
> > Additional parameters list (octets w+1 to z)
> > The *additional parameters list* is included when special parameters and/or requests (associated with a PDP context) need to be transferred between the MS and the network. These parameters and/or requests are not related to a specific configuration protocol (e.g. PPP), and therefore are not encoded as the "Packets" contained in the *configuration protocol options list*.
> > The *additional parameters list* contains a list of special parameters, each one in a separate container. The type of the parameter carried in a container is identified by a specific *container identifier*. In this

FIG. 12A version of the protocol, the following container identifiers are specified:

MS to network direction:
- 0001H (P-CSCF IPv6 Address Request);
- 0002H (IM CN Subsystem Signaling Flag);
- 0003H (DNs Server IPv6 Address Request);
- 0004H (Not Supported);
- 0005H (MS Support of Network Requested Bearer Control indicator);
- 0006H (Reserved);
- 0007H (DSMIPv6 Home Agent Address Request;
- 0008H (DSMIPv6 Home Network Prefix Request);
- 0009H (DSMIPv6 IPv4 Home Agent Address Request);
- 000AH (IP address allocation via NAS signalling);
- 000BH (IPv4 address allocation via DHCPv4);
- 000CH (P-CSCF IPv4 Address Request);
- 000DH (DNs Server IPv4 Address Request);
- 000EH (MSISDN Request);
- 000FH (IFOM-Support-Request);
- 0010H (IPv4 Link MTU Request);
- 0011H (MS support of Local address in TFT indicator); ~~and~~
- 0012H (V2X OCSP stapled certificate(s) included);
- 0013H (V2X OCSP stapled certificate(s) not included); and
- FF00H to FFFFH reserved for operator specific use.

Network to MS direction:
- 0001H (P-CSCF IPv6 Address);
- 0002H (IM CN Subsystem Signaling Flag);
- 0003H (DNs Server IPv6 Address);
- 0004H (Policy Control rejection code);
- 0005H (Selected Bearer Control Mode;
- 0006H (Reserved);
- 0007H (DSMIPv6 Home Agent Address) ;
- 0008H (DSMIPv6 Home Network Prefix);
- 0009H (DSMIPv6 IPv4 Home Agent Address);
- 000AH (Reserved);

FIG. 12B

- 000BH (Reserved);
- 000CH (P-CSCF IPv4 Address);
- 000DH (DNs Server IPv4 Address);
- 000EH (MSISDN);
- 000FH (IFOM-Support);
- 0010H (IPv4 Link MTU);
- 0011H (Network support of Local address in TFT indicator); ~~and~~
- <u>0012H (Provisioned V2X services); and</u>
- FF00H to FFFFH reserved for operator specific use.......

FIG. 12C

Table 5

| |
|---|
| The purpose of the *protocol configuration options* information element is to:<br>- transfer external network protocol options associated with a PDP context activation, and<br>- transfer additional (protocol) data (e.g. configuration parameters, error codes or messages/events) associated with an external protocol or an application.<br><br>The *protocol configuration options* is a type 4 information element with a minimum length of 3 octets and a maximum length of 253 octets.<br><br>The *protocol configuration options* information element is coded as shown in figure 10.5.136/3GPP TS 24.008 and table 10.5.154/3GPP TS 24.008.<br><br>Table 10.5.154/3GPP TS 24.008: *Protocol configuration options* information element<br><br>Configuration protocol (octet 3)<br>Bits<br>3 2 1<br>0 0 0   PPP for use with IP PDP type or IP PDN type (see 3GPP TS 24.301 [120])<br><br>All other values are interpreted as PPP in this version of the protocol.<br>After octet 3, i.e. from octet 4 to octet z, two logical lists are defined:<br>-       the Configuration protocol options list (octets 4 to w), and<br>-       the Additional parameters list (octets w+1 to z).<br>Configuration protocol options list (octets 4 to w)<br>........<br>Additional parameters list (octets w+1 to z)<br>The *additional parameters list* is included when special parameters and/or requests (associated with a PDP context) need to be transferred between the MS and the network. These parameters and/or requests are not related to a specific configuration protocol (e.g. PPP), and therefore are not encoded as the "Packets" contained in the *configuration protocol options list*.<br>The *additional parameters list* contains a list of special parameters, each one in a separate container. The type of the parameter carried in a container is identified by a specific *container identifier*. In this |

FIG. 13A version of the protocol, the following container identifiers are specified:

MS to network direction:
- 0001H (P-CSCF IPv6 Address Request);
- 0002H (IM CN Subsystem Signaling Flag);
- 0003H (DNs Server IPv6 Address Request);
- 0004H (Not Supported);
- 0005H (MS Support of Network Requested Bearer Control indicator);
- 0006H (Reserved);
- 0007H (DSMIPv6 Home Agent Address Request;
- 0008H (DSMIPv6 Home Network Prefix Request);
- 0009H (DSMIPv6 IPv4 Home Agent Address Request);
- 000AH (IP address allocation via NAS signalling);
- 000BH (IPv4 address allocation via DHCPv4);
- 000CH (P-CSCF IPv4 Address Request);
- 000DH (DNs Server IPv4 Address Request);
- 000EH (MSISDN Request);
- 000FH (IFOM-Support-Request);
- 0010H (IPv4 Link MTU Request);
- 0011H (MS support of Local address in TFT indicator); and
- 0012H (V2X certificate(s) included);
- 0013H (V2X certificate(s) not included); and
- FF00H to FFFFH reserved for operator specific use.

Network to MS direction:
- 0001H (P-CSCF IPv6 Address);
- 0002H (IM CN Subsystem Signaling Flag);
- 0003H (DNs Server IPv6 Address);
- 0004H (Policy Control rejection code);
- 0005H (Selected Bearer Control Mode;
- 0006H (Reserved);
- 0007H (DSMIPv6 Home Agent Address);
- 0008H (DSMIPv6 Home Network Prefix);
- 0009H (DSMIPv6 IPv4 Home Agent Address);
- 000AH (Reserved);

FIG. 13B

| | |
|---|---|
| | - 000BH (Reserved); |
| | - 000CH (P-CSCF IPv4 Address); |
| | - 000DH (DNs Server IPv4 Address); |
| | - 000EH (MSISDN); |
| | - 000FH (IFOM-Support); |
| | - 0010H (IPv4 Link MTU); |
| | - 0011H (Network support of Local address in TFT indicator); ~~and~~ |
| | - <u>0012H (Provisioned V2X services); and</u> |
| | - FF00H to FFFFH reserved for operator specific use....... |

FIG. 13C

VEHICLE-TO-EVERYTHING (V2X) SERVICE ACCESS

BACKGROUND

Vehicles can be provided with communication components to allow the vehicles to communicate with each other, with a network or other service infrastructure, or with another device. Examples of information that can be transmitted or received by vehicles can include data collected by sensors, traffic information, status information, and so forth.

BRIEF DESCRIPTION OF THE DRAWINGS

Some implementations of the present disclosure are described with respect to the following figures.

FIGS. 9A-C show Table 1.
FIGS. 10A-E show Table 2.
FIGS. 11A-B show Table 3.
FIGS. 12A-C show Table 4.
FIGS. 13A-C show Table 5.

Figure 1:
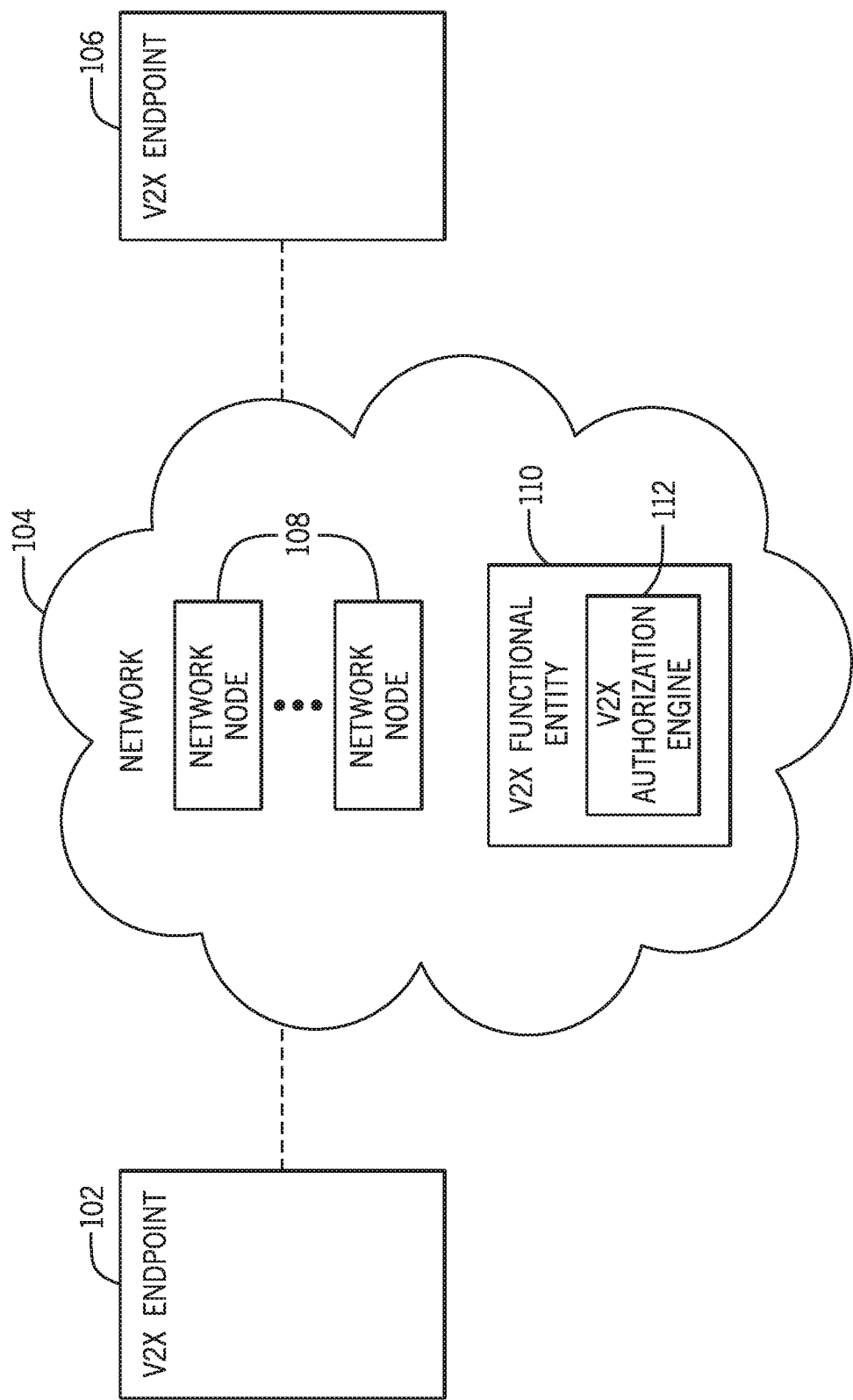
FIG. 1 is a block diagram of an example arrangement that includes vehicle-to-everything (V2X) endpoints and a V2X functional entity, according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), or other types of vehicles including any combinations of any of the foregoing, whether currently existing or after arising.

Vehicle-to-everything (loosely termed "V2X") is a feature that provides for communication of information from a vehicle to other entities (and possibly also/alternatively vice versa) that may affect the vehicle and/or the other entities. V2X includes one or more of a subset of features, including communication of a vehicle to/from any or some combination of the following: other vehicles (vehicle-to-vehicle or V2V communication); an infrastructure, e.g., roadside units (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and so forth.

Networks that support V2X communication can include a cellular network or another type of wireless network. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

Other types of wireless networks can include a wireless local area network (WLAN) that operates according to the Institute of Electrical and Electronics Engineers (IEEE) 802.11 standards (e.g. Dedicated Short Range Communication (DSRC)), IEEE 802.11p standards, an Integrated Digital Enhanced Network (iDEN), and so forth.

A V2X endpoint device refers to an electronic device that is able to participate in a V2X communication. A V2X endpoint device can include a vehicle, an electronic device (e.g., a desktop computer, a notebook computer, a tablet computer, a smartphone, a wearable device, a game appliance, etc.), a roadside unit (which refers to any equipment that is provided on a road, on the side of a road, or in proximity to a road, such as for example, a traffic light, an electronic sign, a toll booth, or any other type of structure), a network node in a network, equipment in an electricity grid, and so forth.

In some cases, a V2X endpoint device may misbehave when communicating with another V2X endpoint device. A misbehaving V2X endpoint device refers to a V2X endpoint device that is exhibiting unexpected or unauthorized behavior, which may be due to, for example, running malware or other untrusted/unauthorized software, or that is being used by an unauthorized user, etc.

A certificate Revocation List (CRL), in its basic form, includes a list of digital certificates (typically compliant to the International Telecommunication Union (ITU) Telecommunication Standardization Sector (ITU-T) X.509 standard) that a Certificate Authority (CA) has decided to revoke before expiration date(s) of the certificates in the list. A digital certificate (such as an identity certificate or public key certificate, for example) can include information used to prove ownership of a key (e.g., a public key) that is used to encrypt communications. A certificate can include information about the key, information about an identity of the key's owner, and a digital signature of an entity that has verified the certificate's contents, for example.

A CRL is produced by a CA for the certificates under the CA's authority, and is to be distributed to, or fetched by, entities that handle data signed by certificates issued by that CA. An entity receiving data signed by a certificate checks to see if the certificate is listed in the CRL, and if the certificate is in the CRL, the receiving entity considers the data as untrustworthy, e.g., equivalent to having received the data unsigned. A CRL typically includes unexpired certificates.

In V2X, CRLs are used to revoke one or more certificates for V2X endpoint devices involved in V2X communications. V2X endpoint devices may use more than one certificate per V2X service. As a result, V2X CRLs are defined such that sufficient information is provided to revoke all certificates for a V2X service for a V2X endpoint device, typically from a certain date/epoch.

V2X endpoint devices may use a set of certificates per V2X service, which allows individual V2X services to be revoked for each V2X endpoint device.

CRLs or sets of CRLs are provisioned to V2X endpoint devices. A V2X endpoint device, once provisioned with a CRL or set of CRLs, can interrogate the CRL(s) when V2X related messaging (digitally signed with respective certificates) is received from another V2X endpoint device, to determine if the other/sending V2X endpoint device can be trusted. If the received V2X related messaging is found to be signed by a certificate that is present in a CRL, then the receiving V2X endpoint device deems the sending V2X endpoint device untrustworthy for all V2X services or just the V2X service for which the V2X messaging was received, and may take appropriate action, e.g., ignore/silently discard the received V2X related messaging.

V2X endpoint devices that are untrusted can also be referred to as "misbehaving V2X endpoint devices." It is possible a V2X endpoint device can be deemed untrusted/ misbehaving for one or more V2X services and trusted/ behaving/not misbehaving for one or more other V2X services.

Depending on how many certificates have been issued by a CA, for what length of time (i.e., validity period), and how many V2X endpoint devices have been deemed misbehaving for one or more V2X services, a CRL can be quite long, and may be subject to many updates.

Issue

V2X endpoint devices using CRL(s) to manage other misbehaving V2X endpoint devices when receiving V2X related messaging is undesirable due to the following reasons.

V2X endpoint devices can be mobile across country borders. Therefore, CRLs may potentially have to contain data pertaining to multiple countries, which can lead to increased sizes of the CRLs.

It can be onerous in terms of processing and memory resource usage for V2X endpoint devices that are recipients of V2X related messaging (including messages) to compare the certificate of each received message with all certificates indicated by a CRL to determine whether or not the message can be trusted. In an urban environment, a V2X endpoint device can receive a large number of signed messages a second, if there are a relatively large number of V2X endpoint devices in proximity to each other.

V2X messages that are communicated over a network (e.g., a wireless network) between V2X endpoint devices and which are ultimately dropped or discarded based on CRLs are wasteful of communication resources of the network.

1. General Implementations

In accordance with some implementations of the present disclosure, a V2X functional entity in a network (e.g., a cellular network, a WLAN, an iDEN, etc.) that is utilized for V2X communication among V2X endpoints can block a V2X endpoint from sending V2X related messaging pertaining to one or more V2X services in cases where the V2X endpoint is deemed untrusted or misbehaving. The blocking may be performed by the V2X functional entity within or outside of the network. Alternatively, the blocking can be performed by a communication component (e.g., a cellular or other wireless modem) in a V2X endpoint device that originated untrusted data.

As used here, in some examples, a "V2X endpoint" (or equivalently "V2X client") refers to an entity that can send and/or receive (more generally, communicate) V2X related messaging. A V2X endpoint can refer to a V2X endpoint device or a program executing in a device.

A "functional entity" can refer to a computing platform or device. A computing platform can include a computer or multiple computers. A functional entity can include any or some combination of the following: an authorization server (e.g., an Authentication, Authorization, and Accounting (AAA) server, a Data Network (DN)-AAA server, etc.), a Remote Authentication Dial-In User Service (RADIUS) server, a Diameter server, etc.), an Extensible Authentication Protocol (EAP) server, a network node, a V2X endpoint, and so forth.

Examples of network nodes that can include the V2X functional entity include any or some combination of the following: a base station such as an eNodeB, a Home eNodeB, etc.; a Gateway GPRS Support Node (GGSN), where GPRS stands for General Packet Radio Service (GPRS); a Serving GPRS Support Node (SGSN); an LTE serving gateway (S-GW); an LTE packet gateway (P-GW); a user plane function (UPF) (which is a 5G core network function); an access and mobility function (AMF) (which is a 5G core network function); a session management function (SMF) (which is a 5G core network function); a firewall entity (such as within a P-GW or GGSN or other network node); and so forth. 5G functions can correspond to LTE functions, e.g., a P-GW provides connectivity from a cellular network to an external network, whereas the UPF provides the same or similar capability. As another example, an MME can contain AMF and SMF functionalities.

A "V2X service" can refer to any service that relates to vehicles or V2X communications, including, as examples, a service relating to a safety of a vehicle, a parking service, a map service, a service to communicate emergency messages, and so forth (e.g., J2945/0 (Onboard System Requirements for V2V Safety Communications), J2945/2, J2945/3, J2945/4, J2945/6, J2945/10, J2945/11, etc.).

FIG. 1 is a block diagram of an example arrangement that includes a V2X endpoint 102 that is able to communicate over a network 104 with another V2X endpoint 106. The network 104 includes various network nodes 108, such as base stations, access points, core network nodes (e.g., any or some combination of an MME, a P-GW, an AMF, an SMF, a UPF, a DN-AAA server, etc.), and so forth.

In addition, the network 104 includes a V2X functional entity 110 that is able to block communication of a V2X endpoint that is untrusted or misbehaving. The V2X functional entity 110 includes a V2X authorization engine 112 that can perform the blocking based on V2X service control information (referred to as "V2X Data" in the ensuing discussion).

As used here, the term "engine" can refer to a hardware processing circuit, which can include any or some combination of the following: a microprocessor, a core of a multi-core microprocessor, a microcontroller, a programmable integrated circuit device, a programmable gate array, or any other hardware processing circuit. Alternatively, a "engine" can refer to a combination of a hardware processing circuit and machine-readable instructions (software and/or firmware) executable on the hardware processing circuit.

Figure 2:
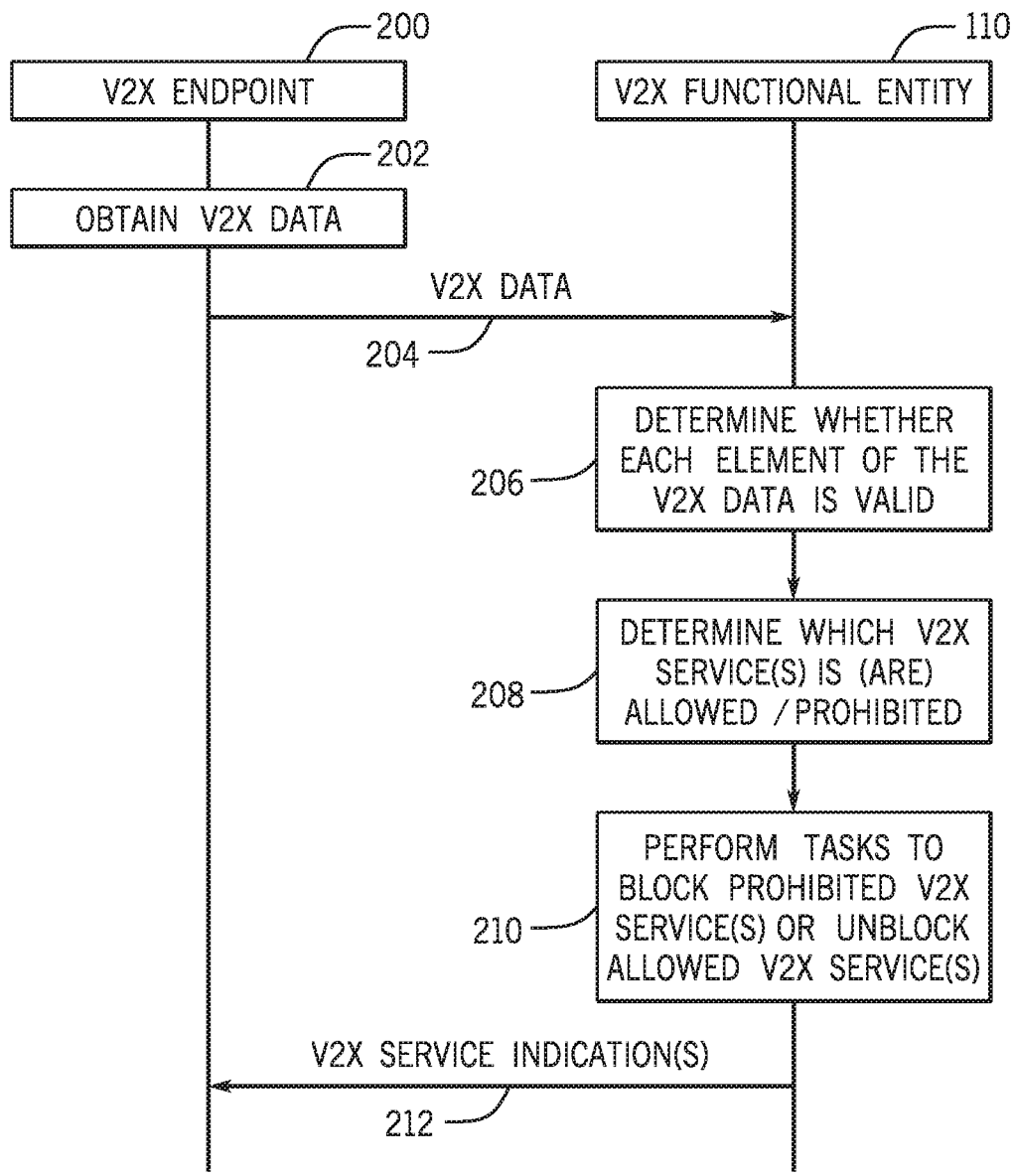
FIG. 2 is a message flow diagram of a process of a V2X endpoint and a V2X functional entity, according to some implementations.

FIG. 2 is a flow diagram of a process that includes tasks of a V2X endpoint 200 (e.g., 102 or 106 in FIG. 1) and the V2X functional entity 110, and more specifically, the V2X authorization engine 112 of the V2X functional entity 110.

The V2X endpoint 200 obtains (at 202) V2X Data (also referred to as "V2X service control information") associated with each V2X service to be accessed by the V2X endpoint. The V2X Data contains information that is used by the V2X functional entity 110 to determine which V2X service(s) a V2X endpoint is allowed and/or prohibited from using.

In some examples, the V2X Data can include any or some combination of the following:
 A certificate (e.g., compliant with a version of ITU-T X.509) including an indication of a V2X service, and which is used for signing V2X messages relating to the V2X service.
 An Online Certificate Status Protocol (OCSP) stapled certificate (see "V2X Data Determination Variant 1" in Section 2 below).
 A token (see "V2X Data Determination Variant 2" in Section 3 below). A token can include a credential used by a V2X endpoint to access a resource. A credential can refer to a username, a password, a certificate, a resource identifier, or any other information that can be used to control access to a resource. In some examples, a token can be constructed using one or more JavaScript Object Notation (JSON) claims.

As used here, a "V2X message" can refer to a data packet, data frame, or any other unit of data used in a V2X communication.

The V2X endpoint 200 sends (at 204) the obtained V2X Data to the V2X functional entity 110. The V2X Data can be included in a message(s) or an information element(s) for example.

In response to receiving the V2X Data from the V2X endpoint 200, the V2X functional entity 110 determines (at 206) whether each element within the V2X Data is valid. The V2X Data can include one or more elements, with each element containing respective information useable to determine which V2X service(s) a V2X endpoint is allowed and/or prohibited from using. For example, there can be one element per V2X Service in the V2X Data. More specific examples of elements of the V2X Data are discussed further below in Section 6.

The determination of whether each element within the V2X Data is valid may include such checks as whether each element is authentic, whether each element has been revoked (e.g., due to a lapse of time), and so forth. The checking may or may not involve communicating with another functional entity (e.g., a V2X application server, an OCSP server, etc.), performing a lookup in a CRL (which may involve communication with a CRL distribution center), and so forth.

If the element(s) of the received V2X Data is (are) valid, the V2X functional entity 110 determines (at 208) which one or more V2X services are allowed and prohibited as follows.

For each element in the received V2X Data that is determined to be invalid as determined (at 206), the respective V2X service is considered prohibited/disabled for the V2X endpoint by the V2X functional entity 110.

For each element in the received V2X Data that is determined to be valid as determined (at 206), the respective V2X service is determined to be allowed/enabled for the V2X endpoint by the V2X functional entity 110.

Each V2X service for which the V2X endpoint is provisioned but for which no element is present in the received V2X Data is considered prohibited/disabled for the V2X endpoint by the V2X functional entity 110.

The V2X functional entity 110 then performs (at 210) the corresponding tasks to block (or equivalently, disable) prohibited V2X service(s) and/or unblock (or equivalently, enable) allowed V2X service(s) for either a specific period of time (e.g., OCSP response period of validity, token period of validity, etc.) or indefinitely (i.e., for a non-specific period of time). The V2X functional entity 110 may block or unblock the V2X endpoint from a V2X service, such as an access network (e.g., a cellular network, a WLAN, an Ethernet network, etc.) or access network supporting system (e.g., LTE Evolved Packet Core/Evolved Packet System (EPC/EPS), 5G Core Network, etc.).

The V2X functional entity 110 can send (at 212) to the V2X endpoint 200 indication(s) of which V2X service(s) is (are) allowed and/or prohibited for use by the V2X endpoint 200.

2. V2X Data Determination Variant 1: OCSP Stapling

In some examples, OCSP stapling can be used to obtain (at 202 in FIG. 2) the V2X Data by the V2X endpoint 200. This technique is referred to as "V2X Data Determination Variant 1."

In V2X Data Determination Variant 1, the V2X endpoint 200 sends a message to one or more OCSP servers (also referred to as OCSP responders) that are associated with the CA(s) of certificates that are associated with the one or more V2X services that the V2X endpoint 200 wishes to use. In response to the message, the V2X endpoint 200 receives from the one or more OCSP response servers zero or more time-stamped OCSP responses. Any received time-stamped OCSP response that indicate a "good" state (see below) is included along with its associated certificate (i.e., an OCSP stapled certificate) in the V2X Data discussed in connection with FIG. 2.

Certificates associated with received error messages and OCSP responses that indicate a state other than "good" (e.g., "revoked" or "unknown," as explained below) may be included or omitted from the V2X Data.

OCSP (e.g., as specified in IETF Request for Comments (RFC) 6960) is a client-server protocol that is used by a client for obtaining the revocation status of a digital certificate (e.g., an X.509-based digital certificate) from a server. Upon receiving a digital certificate (e.g., as part of a signed V2X message), an OCSP client queries an OCSP server to determine if the certificate is valid, e.g., has not been revoked. According to IETF RFC 6066, the OCSP server may provide an OCSP response indicating one of the following states of the received certificate:
 "Good," which indicates a positive response to the status inquiry. This positive response indicates that the certificate is not revoked, but does not necessarily mean that the certificate was ever issued or that the time at which the response was produced is within the certificate's validity interval. Response extensions may be used to convey additional information on assertions made by the responder regarding the status of the certificate, such as a positive statement about issuance, validity, etc.

"Revoked," which indicates that the certificate has been revoked (either permanently or temporarily (on hold)).

"Unknown," which indicates that the responder does not know about the certificate being requested.

OCSP stapling (also known as "TLS Certificate Status Request extension") (e.g., as specified in IETF RFCs 6066 and 6961) modifies OCSP in that instead of the entity that receives a certificate having to contact an OCSP server, the entity that intends to send a certificate (e.g., a V2X endpoint about to send a signed V2X message) first contacts an OCSP server using the above described mechanism, receives a time-stamped OCSP response, and then appends (or "staples") the time-stamped OCSP response to the certificate that the entity sends out. The stapled time-stamped OCSP response proves to all receiving entities that the received certificate is valid (e.g., has not been revoked) for a specific period of validity. This removes the requirement for clients receiving a digital certificate or data signed by a digital certificate to contact the CA who issued the certificate using OCSP themselves, or to check the received certificate against a CRL.

3. V2X Data Determination Variant 2: Obtain a Token

In alternative examples, a token can be used to obtain the V2X Data (at 202 in FIG. 2). This technique is referred to as "V2X Data Determination Variant 2."

In the V2X Data Determination Variant 2, a first signaling protocol is used by the V2X endpoint 200 to communicate with a network node in a network, which sends a token to the requesting V2X endpoint.

The first signaling protocol can be an Open Authorization (OAuth) protocol, an Extensible Authentication Protocol (EAP), or another protocol.

OAuth provides an authorization framework that enables applications to obtain access to user accounts on an Hypertext Transfer Protocol (HTTP) service. OAuth works by delegating user authentication to the service that hosts the user account, and authorizing third-party applications to access the user account.

EAP provides an extensible authentication framework, which includes tools to incorporate authentication schemes into a basic messaging structure.

In some examples, a token may have one or a combination of the following characteristics:

The token identifies the V2X service(s) the V2X endpoint is authorized or has subscribed to use. The V2X service(s) can be either individually identified within a list (0 to many), or the V2X service(s) can be qualified with a set of credentials. The V2X functional entity 110 may use the information of the token to determine if a V2X service is authorized or not.

The token is encrypted so that the V2X endpoint cannot determine the content of the token.

The token includes a first identity of the V2X endpoint e.g., a V2X certificate, a Private User Identity, a Public User Identity, a Mobile Equipment identifier. Examples of a Private User Identity or a Public User Identity can include any or some combination of the following: International Mobile Subscriber Identity (IMSI), a Session Initiation Protocol (SIP) uniform resource identifier (URI), a temporary identifier (ID), an equipment ID such as an International Mobile Equipment Identity (IMEI), a layer 2 address such as a Medium Access Control (MAC) address, a certificate, and so forth. In some examples, a characteristic of this first identity is that it is known to a network and a device (e.g., a V2X endpoint), but is unknown to the public and end user.

The token includes a second identity of an entity (e.g., a user) using the V2X endpoint. The second identity can include any or some combination of the following: a certificate, a username and password, a temporary ID, a set of credentials, a temporary identity, and so forth. For example, the second identity can be an identity a user of the V2X endpoint has in the user's possession or knows about, e.g., a car key, a username and password, a temporary ID, etc. In some examples, a property of the second identity is that it is different from the first identity).

4. Example Implementations of Procedures to Allow, Prohibit, Restrict, or Derestrict a V2X Endpoint In some examples, the V2X functional entity 110 can determine which V2X service(s) is (are) allowed and which is (are) prohibited as follows.

If the V2X Data contains one or more certificates (optionally which include stapled OCSP responses), then the V2X functional entity 110 determines which certificate(s) are valid (e.g., by checking any included OCSP response that is stapled with the certificate, or by checking a CRL, or performing an OCSP lookup of the certificate, etc.). For each certificate that is valid (e.g., has the "good" state), the associated V2X service is determined by the V2X functional entity 110 to be allowed, and for each certificate that is determined to be invalid (e.g., revoked, unknown, does not have the "good" state), then the associated V2X service is determined to be prohibited.

If the V2X Data contains one or more tokens, then the V2X functional entity 110 determines which V2X services are allowed and/or which V2X services are prohibited by checking the content of the received token.

Figure 3:
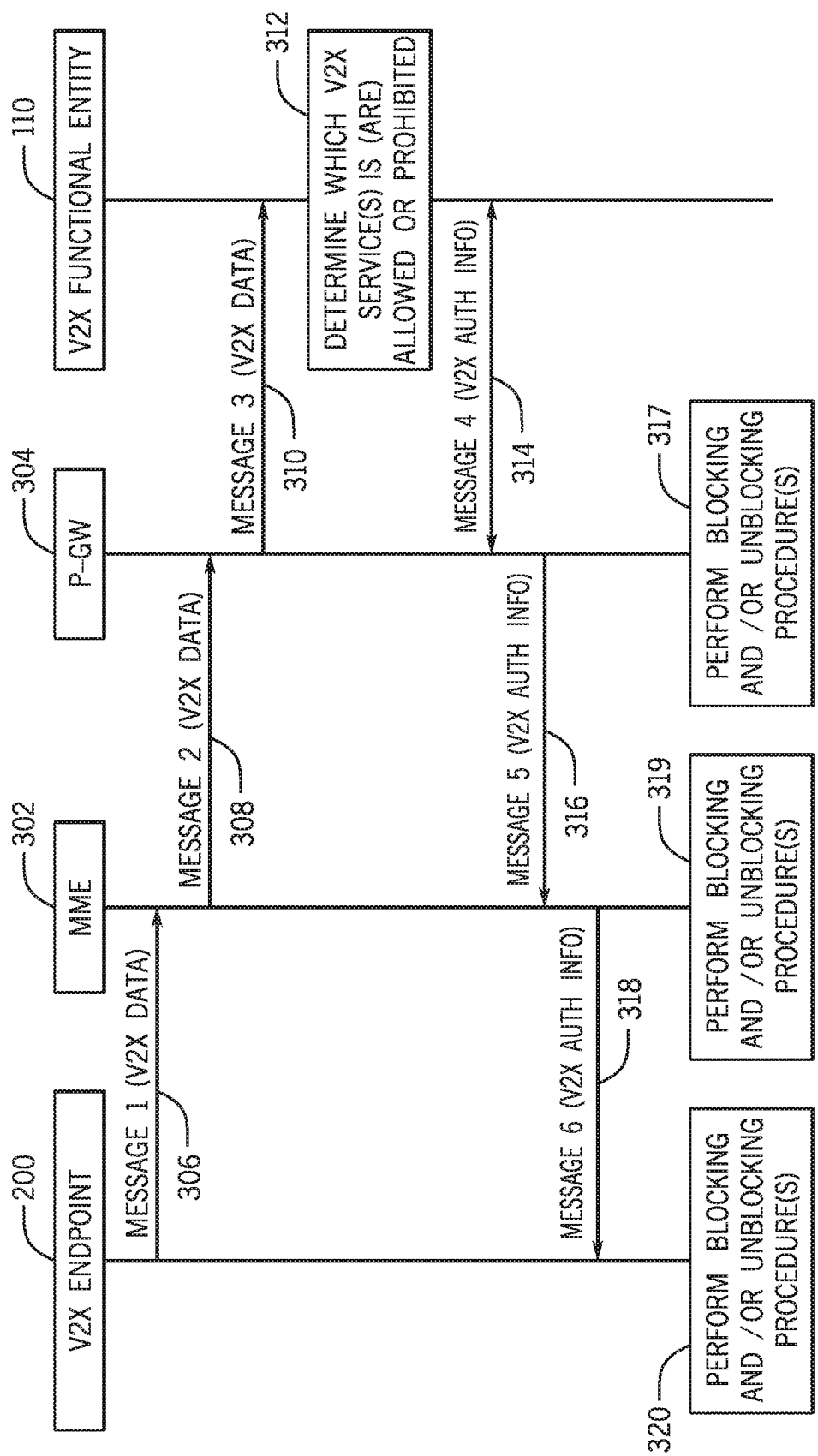
FIGS. 3 and 4 are message flow diagrams of processes of obtaining V2X authorization information, according to various implementations.

4.1 Use of Packet Data Network (PDN) Connectivity Establishment Procedure During Evolved UTRAN (E-UTRAN) Attach or UE Requested PDN Connectivity FIG. 3 is a flow diagram of a process of communication of the V2X Data between the V2X endpoint 200 and the V2X functional entity 110 through network nodes including an LTE Mobility Management Entity (MME) 302 and a P-GW (or alternatively, an SGSN) 304. The MME 302 and P-GW (or SGSN) 304 are core network nodes of an E-UTRAN that operate according to LTE.

In further examples, additional functional entities may be present between the functional entities shown in FIG. 3.

After obtaining (at 202 in FIG. 2) one or more elements for V2X Data (see Section 5 below), the V2X endpoint 200 (which is considered to be a user equipment (UE) in a cellular network such as the E-UTRAN) can provide the V2X Data as part of an E-UTRAN Initial Attach procedure, and/or as part of a UE requested PDN connectivity procedure to a PDN that provides a V2X service (which can include communicating V2X messages).

Note that the V2X endpoint 200 may be unable to provide the V2X Data as part of the E-UTRAN Initial Attach procedure if the V2X endpoint 200 uses a PDN connection to obtain the V2X Data (since to establish a PDN connection an E-UTRAN Initial Attach procedure has to have already been successfully executed).

With reference to FIG. 3, the V2X endpoint 200 sends (at 306) Message 1 that includes the V2X Data to a first network node such as the MME 302. The V2X Data may be included as part of a Protocol Configuration Options (PCO) information element.

PCO provides a request and response mechanism that allows a UE (such as the V2X endpoint 200) to send indicators to a network to indicate to the network information that is sought by the UE. An indicator can include one or more bits or even the absence of one or more bits in a message. Configuration options that a UE can request are described in 3GPP TS 24.008. PCO has also been extended (referred to as ePCO) further to allow the PCO information element to carry more than 253 octets.

The PCO information element is defined in 3GPP TS 24.008 and 3GPP TS 24.302. The transport of the PCO information element between network entities according to a GPRS Tunneling Protocol (GTP) is defined in 3GPP TS 29.060 (for 2G/GERAN and 3G/UMTS/UTRAN systems) and 3GPP TS 29.274 (for LTE/EPC/E-UTRAN systems).

The PCO information element is sent in registration messages (e.g., an Attach message, a Registration message), in a location update or report (e.g., location update (LA), routing area update (RAU), tracking area update (TAU), etc.), in an authentication message (e.g., in an EAP message), and so forth. The foregoing messages are examples of mobility management messages that provide a status to the network, e.g., initial status, periodic status, or location change status.

Message 1 can include an Attach Request message, a Ciphered Options Response message, an EPS Session Management (ESM) Information Request message, an ESM Information Response message, a PDN Connectivity Request message, an Activate Default EPS Bearer Context Request, an Activate Dedicated EPS Bearer Context Request, and so forth.

In response to receiving Message 1, the MME 302 sends (at 308) the received V2X Data to a second network node such as the P-GW 304 in Message 2. Message 2 can include a Create Session Request message, a Create PDP Context Request message, an Authentication Request message, and so forth.

In response to receiving Message 2, the P-GW 304 sends (at 310) the received V2X Data to a third network node such as the V2X functional entity 110 in Message 3. Message 3 can include a RADIUS Access-Request message, a Diameter AA-Request (AAR) message, a Challenge Handshake Authentication Protocol (CHAP) message, and so forth.

In response to receiving Message 3, the V2X functional entity 110 determines (at 312) which V2X service(s) the V2X endpoint 200 is (are) allowed/enabled for and/or which V2X service(s) the UE is (are) prohibited/disabled for (see Section 4 below).

The V2X functional entity 110 then sends (at 314) Message 4 to the P-GW 304 containing V2X authentication information (referred to as "V2X Auth Info"). Message 4 can include a RADIUS Access-Accept message, a Diameter AA-Answer (AAA) message, a CHAP message, and so forth.

In some examples, the V2X Auth Info can contain one or a combination of the following. In other examples, additional or alternative elements can be included in the V2X Auth Info.

- One or more indications of which V2X service(s), if any, is (are) allowed.
- One or more indications of which V2X service(s), if any, is (are) prohibited.
- Quality of Service (QoS) policy information and/or QoS policy indication (e.g., an index to a data structure or storage location that contains the QoS policy information).
- A Traffic Flow Template including information that maps service data flows to radio bearers.
- Blocking information that identifies V2X service(s) prohibited/disallowed for the V2X endpoint 200.
- One or more indications to revoke/disable and/or enable/de-revoke one or more access point names (APNs) from the V2X endpoint's subscriber profile (e.g. in the home subscriber server or HSS). An APN identifies one or more gateways between a cellular network and another network (e.g., the Internet).
- One or more indications to allow connection of and/or disconnection from one or more data connections (e.g., a PDN connection) between the V2X endpoint and a wireless network.
- One or more indications to detach and/or allow attach of the V2X endpoint to/from a cellular network and/or bar the V2X endpoint from attaching to the wireless network.
- One or more indications to enable/invoke or disable/de-invoke control of UE Capabilities, e.g., to prohibit one or more functions associated in the V2X endpoint with the prohibited V2X service(s).
- One or more indications to bar and/or unbar the IMEI of the V2X endpoint from a wireless network (e.g., by adding the IMEI of the V2X endpoint to an Equipment Identity Register (EIR) and/or a Central EIR (CEIR)).
- One or more indications to block and/or unblock one or more source and or destination protocol port(s) (e.g., a UDP port, a TCP port, etc.) and/or one or more source and/or destination addresses (e.g., Internet Protocol (IP) addresses, IP address ranges, host names, domain names, Fully Qualified Domain Name (FQDNs), etc.) pertaining to prohibited V2X service(s) (e.g., by sending one or more traffic flow templates to the V2X endpoint, or by some other mechanism).

In response to receiving Message 4, the P-GW 304 sends (at 316) the received V2X Auth Info in Message 5 to the MME 302. The P-GW 304 may also perform (at 317) one or more blocking procedures and/or unblocking procedures (see Section 8 below) based on the information contained in the V2X Auth Info.

Message 5 can include a Create Session Response message, a Create PDP Context Response message, an Authentication Response message, and so forth.

In response to receiving Message 5, the MME 302 sends (at 318) the received V2X Auth Info in Message 6 to the V2X endpoint 200. The MME 302 may also perform (at 319) one or more blocking procedures and/or unblocking procedures (see Section 8 below) based on the information contained in the V2X Auth Info.

Message 6 can include a Ciphered Options Request message, an ESM Information Request message, an ESM Information Response message, an Initial Context Setup Request message, an Activate Default EPS Bearer Context Accept, an Activate Dedicated EPS Bearer Context Accept, a Downlink Non Access Stratum (NAS) transport with Attach Accept message, a Radio Resource Control (RRC) Connection Reconfiguration message, an RRC Direct Transfer message, and so forth.

In response to receiving the V2X Auth Info in Message 6, the V2X endpoint 200 may perform (at 320) one or more blocking procedures and/or one or more unblocking procedures (see Section 8 below) based on the information in the V2X Auth Info.

Note that Messages 1-3 may contain other information elements in addition to the V2X Data, and Messages 4-6 may contain other information elements in addition to the V2X Auth Info.

Figure 4:
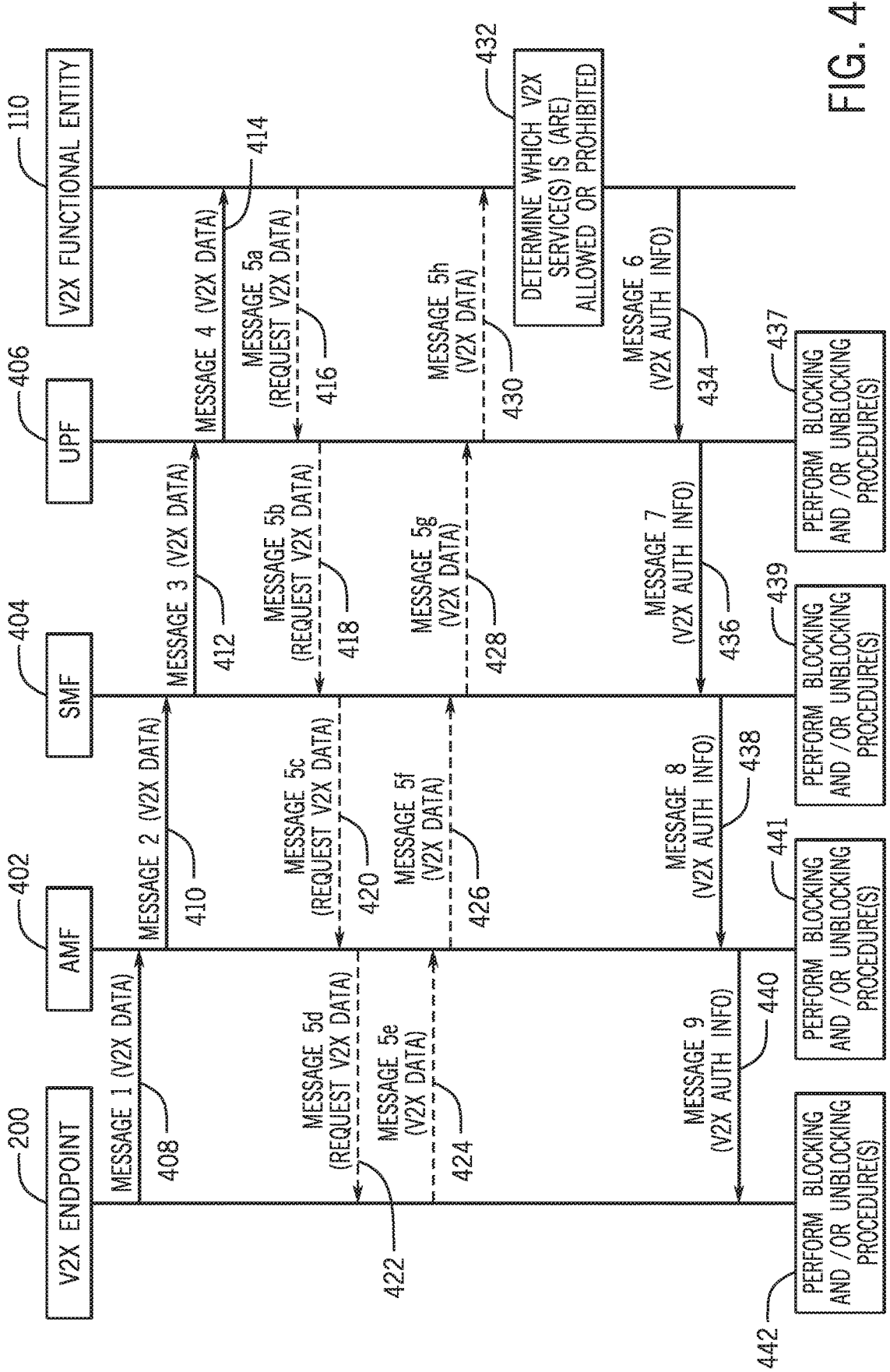

4.2 Use of UE Requested PDU Session Establishment and Secondary Authorization/Authentication by a Data Network (DN)-AAA Server During PDU Session Establishment Procedures FIG. 4 is a flow diagram of an alternative process of communicating messaging between a V2X endpoint 200 and the V2X functional entity 110 through network nodes of a 5G network, including an AMF 402, an SMF 404, and a UPF 406. The tasks performed by endpoints (200, 110) in FIGS. 3 and 4 can be similar or the same, including tasks 312, 320, 432, and 442.

In other examples, the UPF 406 and/or the SMF 404 can be one or both of a P-GW and a GGSN. In other examples, the AMF 402 and/or the SMF 404 can be an MME.

In other examples, additional functional entities may be present between the functional entities shown in FIG. 4.

After obtaining (at 202 in FIG. 2) one or more elements of the V2X Data (see Section 5 below), the V2X endpoint 200 can provide the V2X Data as part of a secondary authorization/authentication by a DN-AAA server during a UE requested PDU Session establishment (see 3GPP TS 23.501 and 3GPP TS 23.502).

The V2X endpoint 200 may include the V2X Data as part of an EAP message exchange, e.g., by including the V2X Data in the NAS session management (SM) Transport messaging (such as an Authentication Message). For example, the V2X Data can be included in one or more of the following: a Protocol Configuration Options information element (IE); and/or a Network Access Identifier (NAI) (see Section 7.1.1 below for possible constructions of the NAI)

As shown in FIG. 4, the V2X endpoint 200 sends (at 408) Message 1 containing the V2X Data to the AMF 402. The V2X Data may be included as part of a PCO IE. Message 1 can include a Packet Data Unit (PDU) Session Establishment Request message, or another message.

In response to receiving Message 1 containing the V2X Data, the AMF 402 sends (at 410) Message 2 containing the V2X Data to the SMF 404. Message 2 can include an Nsmf_PDUSession_CreateSMContext Request message, an Nsmf_PDUSession_UpdateSMContext Request message, and so forth.

In response to receiving Message 2 containing the V2X Data, the SMF 404 sends (at 412) Message 3 containing the V2X Data to the UPF 406.

In response to receiving Message 3 containing the V2X Data, the UPF 406 sends (at 414) Message 4 containing the V2X Data to the V2X functional entity 110.

Although FIG. 4 shows Messages 1-4 as containing the V2X Data, it is noted that it is possible that the V2X Data is not initially sent by the V2X endpoint 200.

In response to receiving Message 4, the V2X functional entity 110 determines if the V2X Data was received. If the V2X Data was not received, then the V2X functional entity 110 sends (at 416) further messaging (Message 5a) to request the V2X Data. The request for the V2X Data contained in Message 5a is forwarded (at 418, 420, and 422) in respective Messages 5b, 5c, and 5d, respectively) to the V2X endpoint 200 via the UPF 406, the SMF 404, and the AMF 402.

In response to the request for the V2X Data, the V2X endpoint 200 sends (at 424) Message 5e containing the V2X Data. The V2X Data is forwarded (at 426, 428, and 430) in respective Messages 5f, 5g, and 5h to the V2X functional entity 110.

In response to receiving the V2X Data (in Message 4 or 5h), the V2X functional entity 110 determines (at 432) which V2X service(s) the V2X endpoint 200 is (are) allowed/enabled for and/or which V2X service(s) the UE is (are) prohibited/disabled for (see Section 4).

The V2X functional entity 110 then sends (at 434) Message 6 containing V2X Auth Info (similar to the V2X Auth Info described in Section 4.1 above) to the UPF 406. In response to receiving Message 6 containing the V2X Auth Info, the UPF 406 sends (at 436) the received V2X Auth Info in Message 7 to the SMF 404. The UPF 406 may also perform (at 437) one or more blocking procedures and/or one or more unblocking procedures (see Section 8 below) based on the information contained in the V2X Auth Info.

In response to receiving Message 7, the SMF 404 sends (at 438) the received V2X Auth Info in Message 8 to the AMF 402. The SMF 404 may also perform (at 439) one or more blocking procedures and/or one or more unblocking procedures (see Section 8 below) based on the information contained in the V2X Auth Info.

In response to receiving Message 8, the AMF 402 sends (at 440) the received V2X Auth Info in Message 9 to the V2X entity 200. The AMF 402 may also perform (at 441) one or more blocking procedures and/or one or more unblocking procedures (see Section 8 below) based on the information contained in the V2X Auth Info.

The UE, upon receiving the message containing V2X Auth Info (Message 9), may perform/apply one or more blocking procedures and/or unblocking procedures (see section 6.4) based on information/data received/contained in V2X Auth Info.

Messages 3, 4 and 5h can include any of an Authentication/Authorization Request message, a RADIUS Access-Request message, a Diameter AA-Request (AAR) message, a CHAP message, and so forth.

Messages 5a to 5h can include EAP messages or parameters.

Messages 5a, 5g, 5b, 6 and 7 can include an Authentication/Authorization Response message, a RADIUS Access-Accept message, a Diameter AA-Answer (AAA) message, a CHAP message, and so forth.

Message 8 can include an N2 PDU Session Request message, or another message.

Message 9 can include an N2 PDU Session Request message, an RRC Connection Reconfiguration message, and so forth.

In response to receiving the V2X Auth Info in Message 9, the V2X endpoint 200 may perform (at 442) one or more blocking procedures and/or one or more unblocking procedures (see Section 8 below) based on the information in the V2X Auth Info.

Note that Messages 1-4 may contain other information elements in addition to or alternatively to the V2X Data, Messages 5e-5h may contain other information elements in addition to the request for V2X Data or the V2X Data, and Messages 6-9 may contain other information elements in addition to the V2X Auth Info.

5. Details of Obtaining V2X Data

Figure 5:
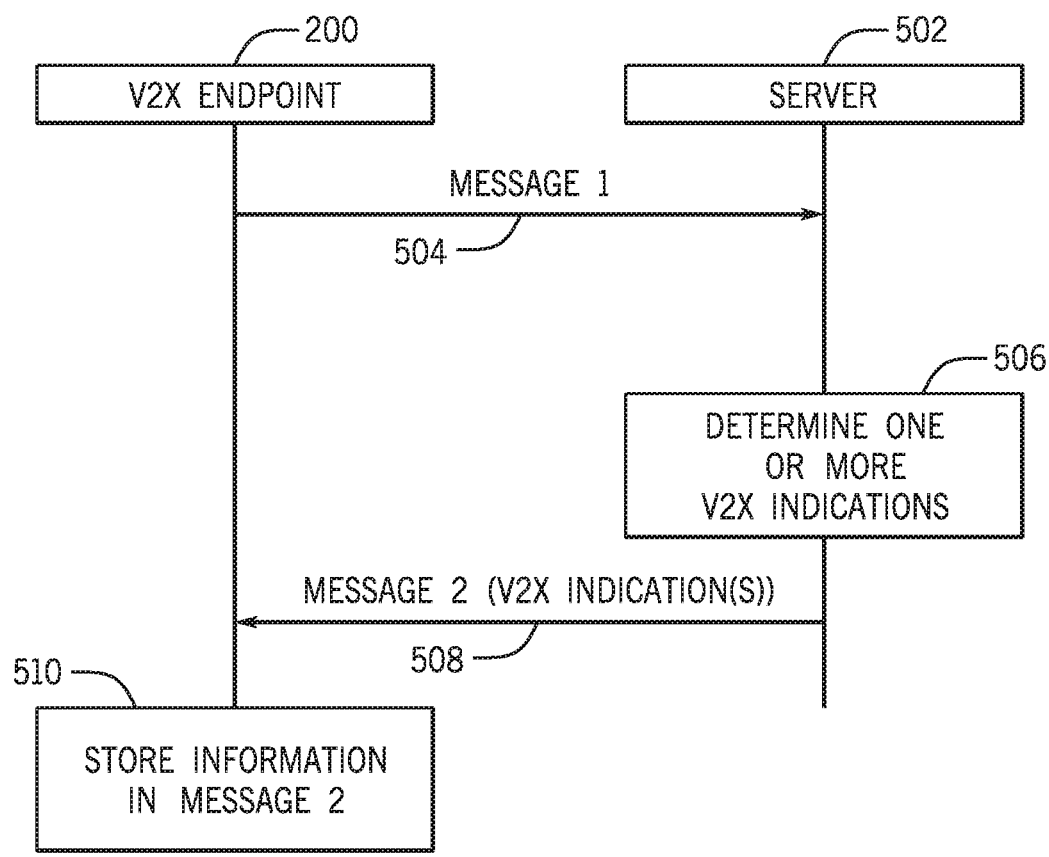
FIG. 5 is a message flow diagram of a process of a V2X endpoint obtaining V2X service control information from a server, according to further implementations.
Figure 6:
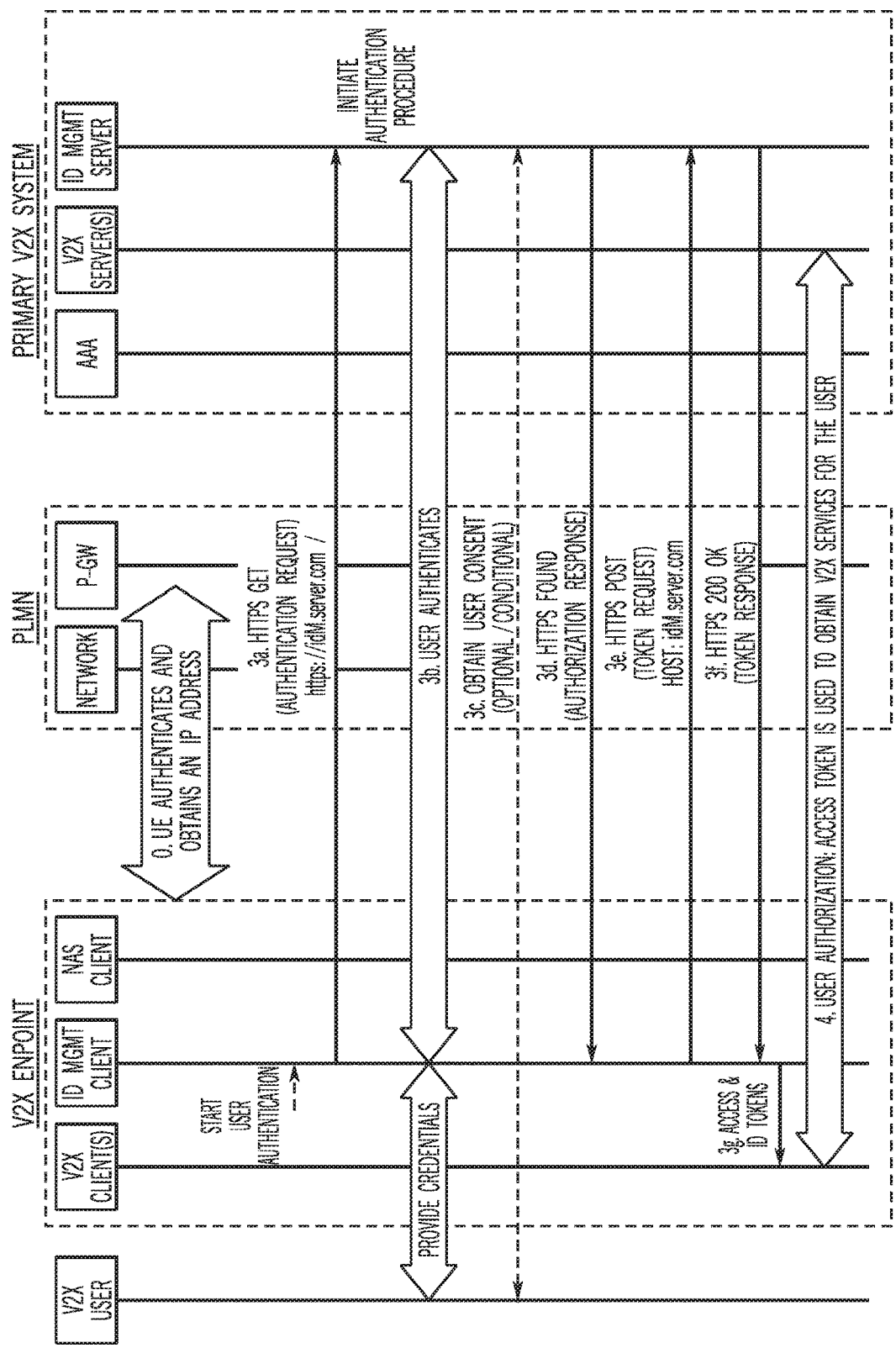
FIG. 6 is a flow diagram of a V2X User Authentication and Registration procedure using the OpenID Connect messages, according to some implementations.

FIG. 5 shows an example of how the V2X endpoint 200 is able to obtain V2X Data from a server 502. The V2X Data can be obtained in a timestamped OCSP response and/or a token, for example.

The server 500 can be one or a combination of an HTTP Proxy, a SIP Proxy, an OCSP server, an OCSP responder, an OAuth server, an Identity Management Server, a SIP server, a Web Server, an HTTP server, a V2X application server, and so forth.

In FIG. 5, the V2X endpoint 200 sets up a connection over a network with the server 502. The connection may be a secured connection (e.g., by using Transport Layer Security (TLS), using IP Security (IPsec), etc.). The V2X endpoint 200 sends (at 504) Message 1 to the server 502. Message 1 can be included in secure setup related messaging, if a secure connection is used between the V2X endpoint 200 and the server 502. Examples of Message 1 can include a SIP REGISTER message, a SIP UPDATE message, an HTTP GET message, an HTTP PUT message, and so forth.

Message 1 can include one or more of the following information:
  Location of the V2X endpoint. A location can include any or some combination of the following: global positioning system (GPS) coordinates, a cell identifier of a cell of a cellular network, a Location Area identifier, a Routing Area identifier, a Tracking Area identifier, a Public Land Mobile Network (PLMN) identifier, a waypoint, an address, and so forth.
  A first identity of the V2X endpoint (see explanation of "first identity" in Section 3 above).
  One or more certificates, e.g., one certificate per V2X service that the V2X endpoint wishes/intends to use.

In response to receiving Message 1, if the server 502 determines that the V2X endpoint 200 has one or more V2X services provisioned/enabled/allowed, then the server 502 determines (at 506) one or more V2X indications relating to the V2X service(s). The server 502 determining the one or more V2X indications can include the server 502 creating the one or more V2X indications or retrieving the one or more V2X indications.

Each V2X indication can contain a token, a time-stamped OCSP response, and so forth. Each V2X indication can indicate whether the V2X endpoint 200 is allowed or prohibited to use an individual V2X service or a group of V2X services. The one or more V2X indications may be stored by the server 502 in association with the first identity of the V2X endpoint 200, if the first identity was received by the server 200 in Message 1.

The server 502 sends (at 508) Message 2, which contains the one or more V2X indications (e.g. one or more tokens, one or more time-stamped OCSP responses, etc.). Note that the one or more V2X indications make up the V2X data obtained (at 202 in FIG. 2) by the V2X endpoint 200.

If the server 502 determines that the V2X endpoint 200 has one or more V2X services that are not provisioned or are disabled/prohibited, then the server 502 obtains a V2X indication that the V2X endpoint 200 has no V2X services or some V2X services are unavailable. In such cases, each V2X indication sent by the server 502 to the V2X endpoint 200 in Message 2 can include one or more of:
  Information indicating that the V2X endpoint 200 failed authentication.
  Information indicating that the V2X endpoint 200 is not allowed to use any V2X services.
  Information indicating that the V2X endpoint 200 is not allowed to use a specific V2X service or a specific group of V2X services (e.g., Message 2 contains V2X indication(s) of the V2X service(s) not allowed to be used).
  Information indicating that the V2X endpoint 200 is not allowed to use V2X services when roaming.
  Information indicating that the V2X endpoint 200 is not allowed to use V2X services in a particular network (e.g., a PLMN). The information can optionally include the identity or identities of network(s) that support V2X services.
  Information indicating that a received certificate is revoked or unknown.

If the server 502 is unable to determine whether V2X services are provisioned or not provisioned for the V2X endpoint 200, and one or more certificates were received in Message 1, then the server 502 may either (1) behave as discussed above in the scenario where the server 502 determines that V2X service(s) is (are) not provisioned or are disabled/prohibited, or (2) send Message 2 containing one or more OCSP responses.

The server 502 can determine which V2X service(s) can be used by the V2X endpoint 200 based on one or more of the following:
  Location of the V2X endpoint.
  Identity of the V2X endpoint.
  Network (e.g., PLMN, Service Set Identifier (SSID), etc.) the V2X endpoint is connected to.
  Performing a lookup in one or more CRLs of received certificates.

The V2X endpoint 200 stores (at 510) the information in the received Message 2.

If the V2X endpoint 200 received information in Message 2 responsive to a determination by the server 502 that one or more V2X services are not provisioned or are disabled/prohibited, the V2X endpoint 200 can perform any one or more of the following: display information of a V2X indication on a display device; and play an audible sound. If the received V2X indication indicates that the V2X endpoint 200 is not allowed to use V2X services in a particular network, the V2X endpoint 200 may repeat the process of FIG. 5 if another network is available, e.g., there is another network that does not match the current Registered PLMN (RPLMN).

Note that the process of FIG. 5 may be performed multiple times, e.g., once per V2X service, once for each V2X certificate, and so forth.

6. Details of Specific Variance of Communication with the Server 502

In some examples, there are two techniques for communication between the V2X endpoint 200 and the server 502. In other examples, other techniques can be used.

A first technique extends OAuth and OpenID using JavaScript Object Notation (JSON) tokens so that the V2X Data can be communicated back to the V2X endpoint 200. The V2X endpoint 200 uses this V2X Data in subsequent communications with the network. The V2X Data as an Access of ID JSON token is discussed in Section 6.1.1, and the information flow of how this V2X Data is communicated between the server 502 and V2X endpoint 2 is discussed in Section 6.1.2.

The OpenID Connect framework in 3GPP includes an ID token and an Access token, among possibly other tokens. The tokens are obtained per the OAuth 2.0 protocol. The ID token and Access token are part of the OpenID Connect framework, where tokens are described using "JSON claims." "JSON claims" may also be referred to as attributes. OpenID has a standard set of JSON claims that can be expanded to include other/further JSON claims.

The ID token resembles the concept of an identity card and is described in a JSON Web Token (JWT) profile. The ID token contains attributes that identify a user, e.g., name, address, phone numbers, etc.

In a second technique, JSON tokens are communicated to the V2X endpoint 200, but the JSON tokens use EAP as the transport mechanism. EAP is an authentication mechanism that can be used in non-3GPP access and also for 5G. Section 6.2 describes an information flow of how EAP is used with an example change to the current standards. In other examples, other transport mechanisms can be used to transport the JSON token to the V2X endpoint.

6.1 Communication with the Server 502 Using OAuth (First Technique)

6.1.1 V2X Data as an Access or ID Token Structure

A token may include the following claims (e.g., JSON claims), as set forth in the table below:

| Claim | Content |
| --- | --- |
| V2X Service_1 | Username<br>Password<br>Or credentials |
| V2X Service_2 | Username<br>Password |

The two claims in the table above refer to two respective V2X services (V2X Service_1 and V2X Service_2).

The username and password represent credentials that are used so that an entity that authorizes V2X services can use these credentials to determine what V2X services are allowed.

An alternative token is set forth in the table below:

| Claim | Content |
| --- | --- |
| V2X services authorized | List (zero to many) of V2X services that the V2X endpoint is allowed to use |

The authorized V2X services can be based upon any or some combination of the following:
- Credentials entered into the V2X endpoint (e.g., a user enters a username and password), where the credentials are associated with V2X service(s) that a user may have subscribed to.
- Location of the V2X endpoint. The location identifies all or a subset of V2X services that are allowed to be used.
- Identity of the V2X endpoint. The identity of the V2X endpoint identifies the capabilities of the V2X endpoint.

6.1.2 Information Flow

As noted above, the first technique is an example of how OAuth and OpenID can be extended using JSON tokens so that the V2X Data can be communicated back to the V2X endpoint. The V2X endpoint can then use this V2X Data in subsequent communications with the network.

Table 1 in FIGS. 9A-9C shows how the current 3GPP TS 33.180 standard can be modified to support this first technique. The underlined text refers to text added to the current standard.

Note: In one example, the V2X user can be considered to be the vehicle key when the V2X endpoint is realized as a vehicle.

6.2 Communication with the Server 502 Using EAP During 5G Registration (Second Technique)

Figure 7:
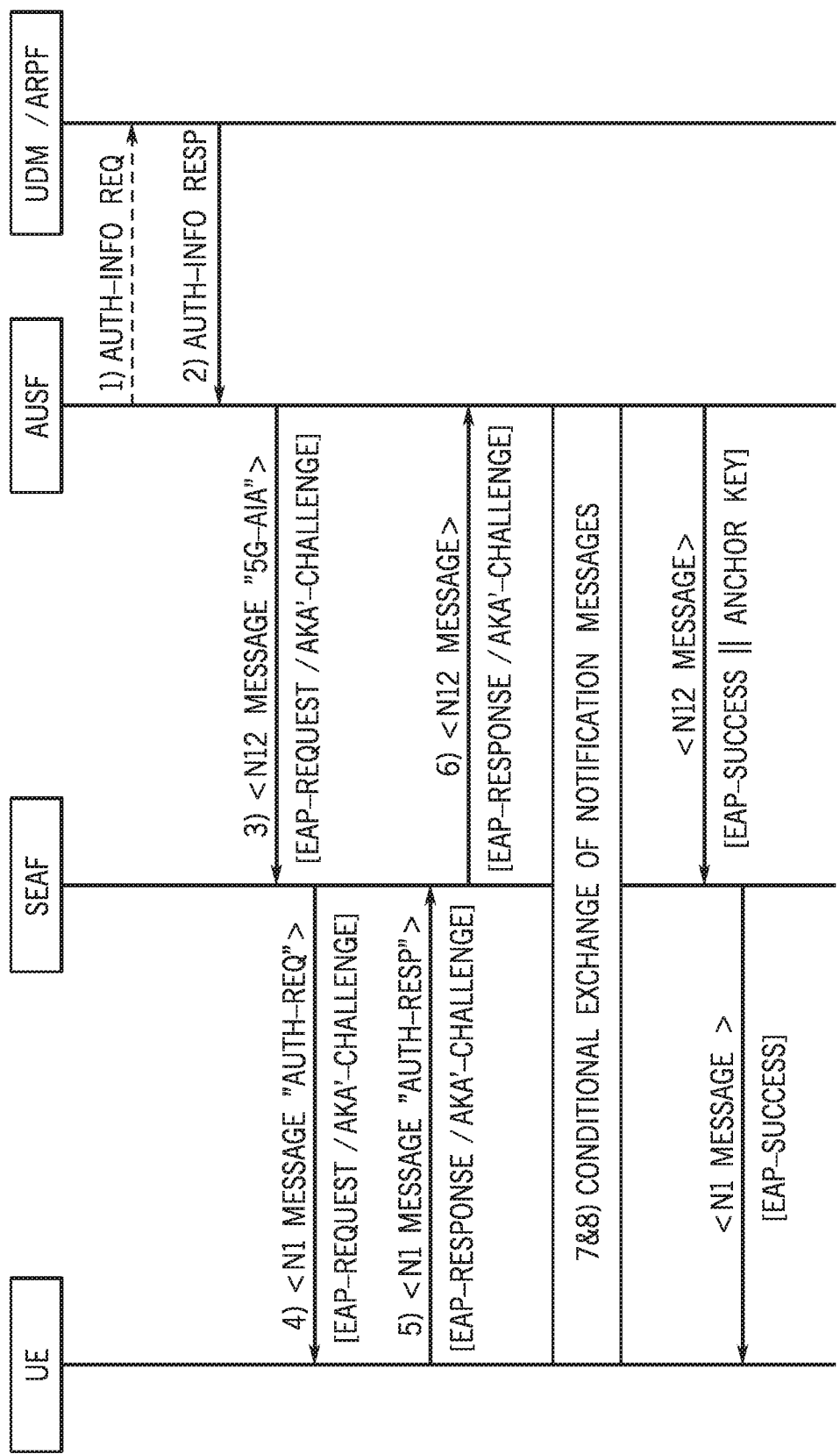
FIG. 7 is a flow diagram of a procedure that uses an Extensible Authentication Protocol (EAP) framework to obtain V2X service control information, according to further implementations.

FIG. 7 shows an example of a procedure of the second technique that uses the EAP framework to obtain V2X Data in a 5G network. The procedure is applicable to other EAP framework techniques, such as EAP techniques used to access WLANs, the only difference being the names of the functions.

In FIG. 7, "SEAF" stands for "SEcurity Anchor Function," "AUSF" stands for the "Authentication Server Function," "UDM" stands for "Unified Data Management," and "ARPF" stands for "Authentication credential Repository and Processing Function." These are functions of a 5G network.

Table 2 in FIGS. 10A-10E proposes changes to the current 3GPP TS 24.302 standard for illustrative purposes. Underlined text refers to new text. The term "UE" can refer to a V2X endpoint. The text can be similarly incorporated into other appropriate standards.

6.3 Communication with the Server 502 Using OCSP Stapling

Existing techniques using OCSP can be used for obtaining OCSP responses that include V2X Data.

7. Encoding of V2X Data 7.1 Token

A token can be seen as a string of alphanumeric characters by the receiving entity. Thus, the token can be sent in any of the following formats.

7.1.1 Token as Part of NAI

When a V2X endpoint uses a Network Access Identifier (NAI) to access a network, the token can be included as part of the NAI.

The token can be included as part of the username (e.g., token@domain.com), as part of a label in a domain name of the NAI (username@token.domain.com), or as part of a fully qualified domain name (FQDN) or decorated NAI (e.g., domain.com!username@token.domain2.com).

In the latter example, the label "domain2.com" indicates the domain that issued the token.

In some examples, an authentication task can be repeated such that the token can be included, and then the V2X endpoint is authorized for V2X services.

7.1.2 Token in PCO

In another example, a token may be included in a new PCO IE, shown in the table below. Alternatively, an existing portion of the PCO IE can be used, such as those used to convey Password Authentication Protocol (PAP) and or CHAP information.

Table 3 in FIGS. 11A-11B sets forth changes to be made to Section 10.5.6.3 (protocol configuration options) of the current 3GPP TS 24.008 standard. Underlined text indicates added text.

7.1.3 Other Mechanisms

In further examples, a token can also be included in new or existing IEs in Mobility Management messages and/or Session Management messages.

7.2 Certificate with Stapled OCSP Response 7.2.1 Certificate with Stapled OCSP Response as Part of PCO A certificate with stapled OCSP response may be included in a new PCO IE, shown in the table below. Alternatively, an existing PCO IE can be used, such as those used to convey PAP and or CHAP information.

Table 4 in FIGS. 12A-12C sets forth changes to Section 10.5.6.3 of the current 3GPP TS 24.008 standard. Underlined text indicates added text.

7.3 Certificate 7.3.1 Certificate is Part of PCO

A certificate may be included in a new PCO IE, shown in the table below. Alternatively, an existing PCO IE can be used, such as those used to convey PAP and or CHAP information.

Table 5 in FIGS. 13A-13C sets forth changes to Section 10.5.6.3 of the current 3GPP TS 24.008 standard. Underlined text indicates added text.

8. Blocking and Unblocking

For V2X services determined to be prohibited, one or more V2X functional entities (e.g., GGSN, SGSN, PGW, SGW, MME, UPF, AMF, SMF, UE, etc.) may perform one or a combination of the following:

- Disable/revoke one or more APNs from the V2X endpoint's subscriber profile (e.g., in the HSS, UDM, or generally a database that contains subscriber profile/ policy data).
- Disconnect one or more data connections (e.g., PDN connection) between the V2X endpoint and the cellular network.
- Detach the V2X endpoint from the cellular network (e.g., send a Cancel Location message for the V2X endpoint's associated UE, e.g., to an MME, SGSN, S-GW, etc.) and/or bar the V2X endpoint from attaching to the cellular network.
- Invoke/enable Control of UE Capabilities, e.g., to prohibit one or more functions associated in the V2X endpoint with the prohibited V2X service(s).
- Bar the IMEI of the V2X endpoint from the cellular network e.g., by adding the IMEI of the V2X endpoint to an EIR and/or a CEIR.
- Block one or more source and or destination protocol port(s) (e.g., UDP ports, TCP ports, etc) and/or one or more source and/or destination addresses (e.g., IP addresses, IP address ranges, host names, domain names, FQDNs, etc) pertaining to the prohibited V2X service(s) (e.g., by sending one or more Traffic Flow Templates to the UE associated with the V2X endpoint, some other means) at one or more cellular entities e.g., UE, UPF, PGW, SGW, GGSN, etc.

For all V2X services determined to be allowed, one or more V2X functional entities (e.g., GGSN, SGSN, PGW, SGW, MME, UPF, AMF, SMF, UE, etc.) may perform one or a combination of the following:

- Enable/de-revoke one or more APNs in the V2X endpoint's subscriber profile (e.g., in the HSS).
- Allow connection of one or more data connections (e.g., PDN connection) between the V2X endpoint and the cellular network.
- Allow attach of the V2X endpoint to the cellular network and/or unbar the V2X endpoint from attaching to the cellular network.
- De-invoke/disable Control of UE Capabilities to allow one or more functions associated in the V2X endpoint with the prohibited V2X service(s).
- Unbar the IMEI of the V2X endpoint from the cellular network e.g., by removing the IMEI of the V2X endpoint from an EIR and/or a CEIR.
- Unblock one or more source and or destination protocol port(s) (e.g., UDP ports, TCP ports, etc.) and/or one or more source and/or destination addresses (e.g., IP addresses, IP address ranges, host names, domain names, FQDNs, etc.) pertaining to the allowed V2X service(s) (e.g., by sending one or more Traffic Flow Templates to the UE associated with the V2X endpoint, some other means) at one or more cellular entities e.g., UE, UPF, PGW, SGW, GGSN, etc.

9. System/Device Architecture

Figure 8:
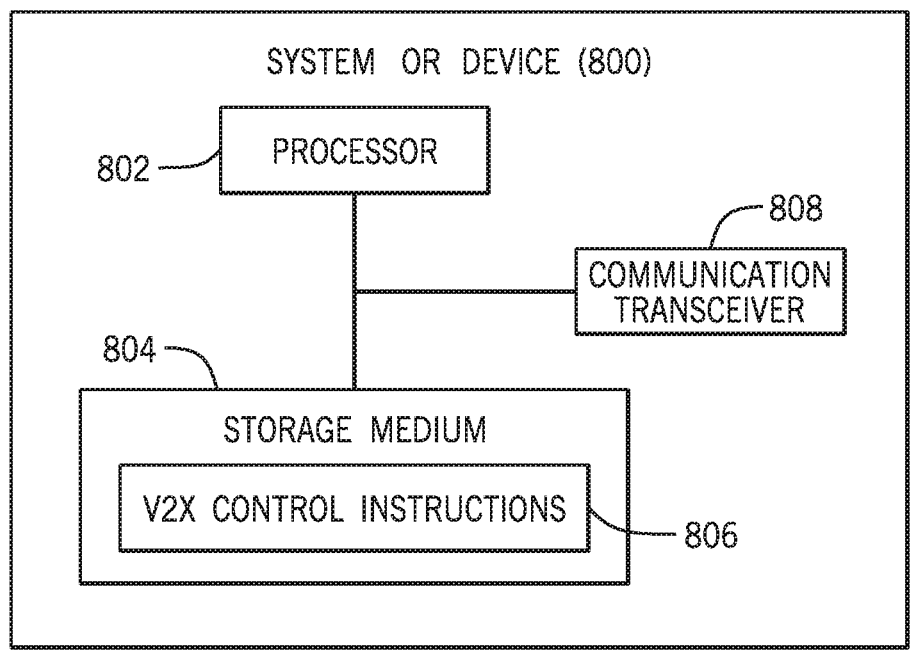
FIG. 8 is a block diagram of a system or device according to some implementations.

FIG. 8 is a block diagram of a system or device 800, which can be used to implement any of the following: a V2X endpoint, a V2X functional entity, and so forth.

The system or device 800 includes a processor 802 (or multiple processors). A processor can include a microprocessor, a core of a multi-core microprocessor, a microcontroller, a programmable integrated circuit, a programmable gate array, or another hardware processing circuit.

The system or device 800 includes a non-transitory machine-readable or computer-readable storage medium 804 that stores machine-readable instructions executable on the processor 802 to perform various tasks. Machine-readable instructions executable on a processor can refer to the instructions executable on a single processor or the instructions executable on multiple processors.

The machine-readable instructions include V2X control instructions 806 that are executable by any of the entities discussed above to perform various tasks according to some implementations relating to allowing or prohibiting use of one or more V2X services by a V2X endpoint.

The system or device 800 further includes a communication interface 808 to perform communications over a network (wireless or wired network). The communication interface 808 includes a communication transceiver, such as a radio frequency (RF) transceiver or another type of transmitter/receiver. The communication interface 808 can also include protocol layers of a protocol stack that govern communications according to various network protocols.

The storage medium 804 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of at least one hardware processor, comprising:
   receiving, by a vehicle-to-everything (V2X) endpoint, V2X service control information that indicates whether the V2X endpoint is allowed to use one or more V2X services, wherein the V2X service control information is received in an information flow according to a standard selected from among an Open Authorization (OAuth) standard, or an OpenID standard, or an Extensible Authentication Protocol (EAP) standard;
   sending, by the V2X endpoint to a network, the V2X service control information when attempting to access a V2X service or a group of V2X services; and
   receiving, by the V2X endpoint from the network in response to the sending of the V2X service control information, V2X authorization information relating to accessing one or more V2X services.

2. The method of claim 1, wherein the V2X authorization information comprises one or more of:
one or more indications of which V2X services, if any, are allowed,
one or more indications of which V2X services, if any, are prohibited,
quality of service (QoS) information,
one or more indications to disable or enable one or more access point names (APNs),
one or more indications to allow a connection or disconnection of one or more data connections between the V2X endpoint and the network,
one or more indications to allow detach or attach of the V2X endpoint from or to the network,
one or more indications to enable or disable control of capabilities of the V2X endpoint,
one or more indications to bar or unbar a device identity of the V2X endpoint from the network, and
one or more indications to block or unblock one or more of a source protocol port, a destination protocol port, a source address, and a destination address.

3. The method of claim 1, wherein the sending of the V2X service control information uses a protocol different or the same as the standard.

4. The method of claim 1, further comprising:
sending, by the V2X endpoint, first information to a server, the first information including one or more of a location of the V2X endpoint, an identity of the V2X endpoint, and one or more certificates for respective one or more V2X services that the V2X endpoint is to use,
wherein the receiving of the V2X service control information is from the server responsive to the first information.

5. The method of claim 1, wherein the V2X service control information indicates that the V2X endpoint is not allowed to use one or more V2X services.

6. The method of claim 1, wherein the V2X service control information indicates that the V2X endpoint is not allowed to use one or more V2X services when roaming or when in a particular network.

7. The method of claim 1, wherein the V2X service control information includes a token that is part of a network access identifier (NAI).

8. The method of claim 7, wherein the token is part of a username in the NAI.

9. The method of claim 7, wherein the token is part of a label in a domain name of the NAI.

10. The method of claim 1, wherein the V2X service control information includes a token that is part of a Protocol Configuration Options (PCO) information element.

11. The method of claim 1, wherein the V2X service control information includes a certificate with a stapled Online Certificate Status Protocol (OCSP) response that is part of a Protocol Configuration Options (PCO) information element.

12. The method of claim 1, wherein the V2X service control information is sent in a message that is part of a wireless network attach procedure.

13. The method of claim 1, wherein the V2X service control information is sent in a message that is part of a packet data network (PDN) connection procedure.

14. The method of claim 13, wherein the V2X service control information is sent to an entity as part of an authentication procedure.

15. The method of claim 1, comprising, for a first V2X service that is determined to be prohibited, blocking use of the first V2X service using one or more of:
disabling one or more access point names (APNs) from a subscriber profile of the V2X endpoint;
disconnecting one or more data connections between the V2X endpoint and the network;
detaching the V2X endpoint from the network;
barring the V2X endpoint from attaching to the network;
enabling control of a capability of the V2X endpoint associated with a function corresponding to the first V2X service;
barring an identity of the V2X endpoint from the network; and
blocking one or more of a source protocol port, a destination protocol port, a source address, and a destination address.

16. The method of claim 1, comprising, for a first V2X service that is determined to be allowed, allowing the first V2X service using one or more of:
enabling one or more access point names (APNs) in a subscriber profile of the V2X endpoint;
allowing a connection of one or more data connections between the V2X endpoint and the network;
allowing an attachment of the V2X endpoint to the network;
disabling control of a capability of the V2X endpoint associated with a function corresponding to the first V2X service;
unbarring an identity of the V2X endpoint from the network; and
unblocking one or more of a source protocol port, a destination protocol port, a source address, and a destination address.

17. A system comprising:
a processor; and
a non-transitory storage medium storing instructions executable on the processor to:
receive, from a vehicle-to-everything (V2X) endpoint, V2X service control information that indicates whether the V2X endpoint is allowed to use one or more V2X services;
determine, based on checking a certificate in the V2X service control information, a given V2X service that is allowed or disallowed; and
send, to the V2X endpoint, a response indicating the given V2X service that is allowed or disallowed.

18. The system of claim 17, wherein the determining of whether the given V2X service is allowed or disallowed is based on or more of: determining whether an information element in the V2X service control information is authentic, determining whether an information element in the V2X service control information has expired, or checking a certificate revocation list.

19. A non-transitory machine-readable storage medium storing instructions that upon execution cause a vehicle-to-everything (V2X) endpoint device to:
receive V2X service control information that indicates whether the V2X endpoint device is allowed to use one or more V2X services;
send, to a network, the V2X service control information when attempting to access a V2X service or a group of V2X services, wherein the V2X service control information is sent in a message that is part of a wireless network attach procedure or a packet data network (PDN) connection procedure; and receive, from the network in response to the sending of the V2X service control information, V2X authorization information relating to accessing one or more V2X services.

20. The non-transitory machine-readable storage medium of claim 19, wherein the V2X service control information is received in an Online Certificate Status Protocol (OCSP) message.

21. The non-transitory machine-readable storage medium of claim 19, wherein the V2X service control information is received in a JavaScript Object Notation (JSON) web token.

22. The non-transitory machine-readable storage medium of claim 19, wherein the V2X service control information is received in a certificate.

* * * * *